May 6, 1969 J. E. STAATS 3,443,150
CROSSED-FIELD DISCHARGE DEVICES AND MICROWAVE OSCILLATORS
AND AMPLIFIERS INCORPORATING THE SAME
Filed June 2, 1966 Sheet 2 of 12

FIG.2

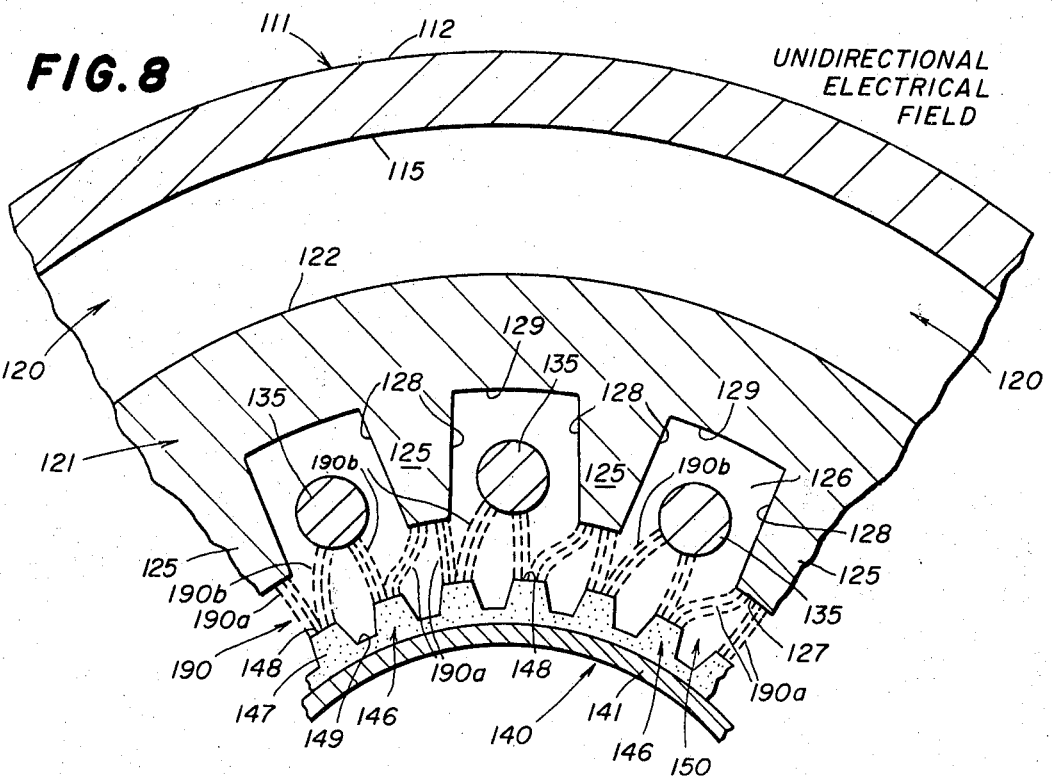
FIG. 8 — UNIDIRECTIONAL ELECTRICAL FIELD
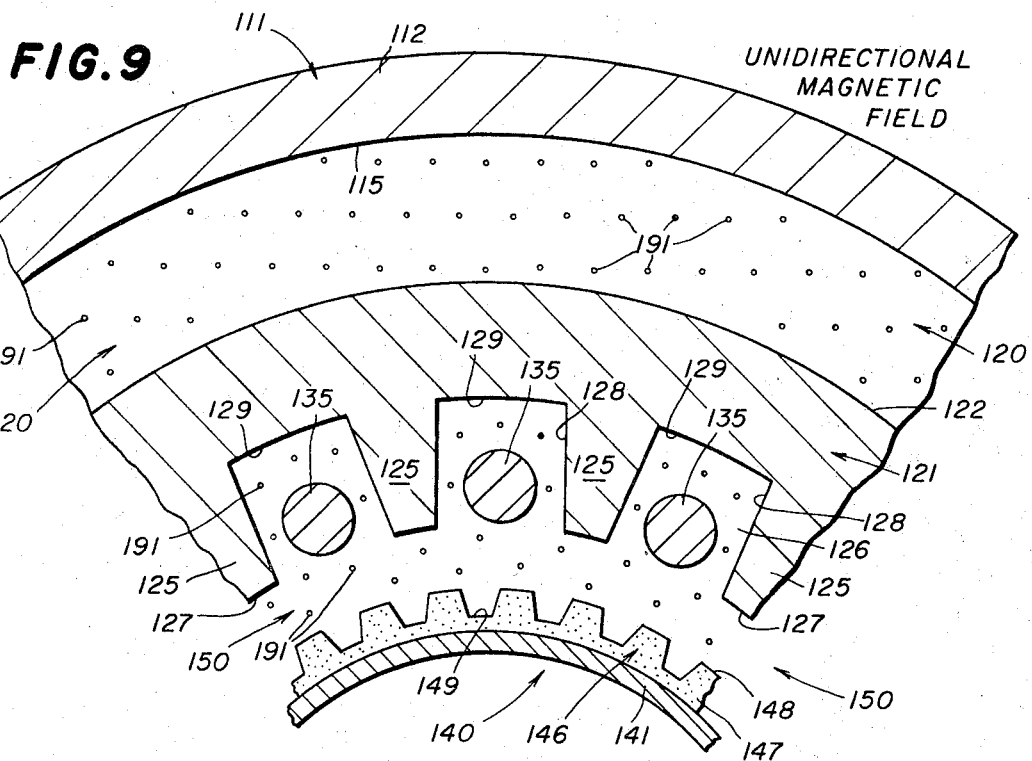
FIG. 9 — UNIDIRECTIONAL MAGNETIC FIELD

ELECTRON FLOW

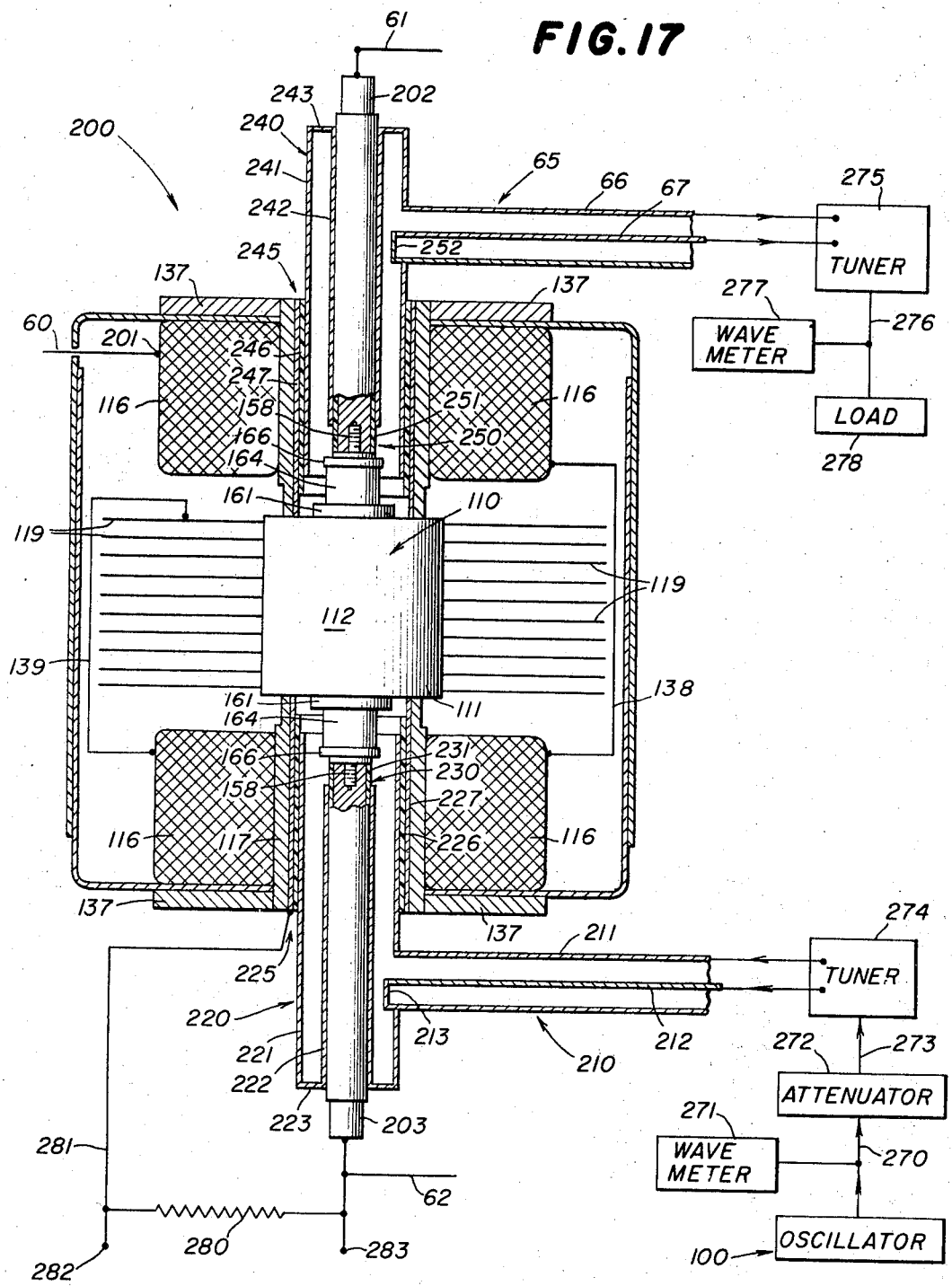

United States Patent Office 3,443,150
Patented May 6, 1969

3,443,150
CROSSED-FIELD DISCHARGE DEVICES AND MICROWAVE OSCILLATORS AND AMPLIFIERS INCORPORATING THE SAME
James E. Staats, Louisville, Ky., assignor to General Electric Company, a corporation of New York
Filed June 2, 1966, Ser. No. 554,806
Int. Cl. H01j 25/50
U.S. Cl. 315—39.51
30 Claims

ABSTRACT OF THE DISCLOSURE

A crossed-field discharge device is disclosed comprising a hollow anode structure including a pair of coaxial annular members connected together at one end and a cathode structure disposed within the inner anode member and defining therewith an axially extending interaction space, the pair of anode members defining therebetween an axially extending annular space communicating with the interaction space, the anode structure having axially extending anode recesses therein in which are mounted rods supported independently both of said anode structure and said cathode structure; oscillators and amplifiers incorporating the crossed-field discharge device therein are also disclosed.

---

The present invention relates to improved crossed-field discharge devices, and to microwave circuits incorporating the same including microwave oscillator circuits and microwave amplifier circuits.

It is a general object of the invention to provide new and improved crossed-field discharge devices for use at microwave frequencies, which devices are of exceedingly simple and economical construction and arrangement, and which devices are particularly adapted for operation upon the application of relatively low voltage operating potentials thereto.

Another object of the invention is to provide improved crossed-field discharge devices of the type set forth which can provide a high output of microwave energy in proportion to the physical dimension thereof, whereby to permit the miniaturization of microwave circuits embodying the improved crossed-field discharge devices of the present invention.

Another object of the invention is to provide a crossed-field discharge device of the type set forth comprising an anode structure including an annular outer anode member and an annular inner anode member disposed within the outer anode member and electrically connected thereto at one end of the anode structure, the anode members cooperating to define a first axially extending space therebetween and the inner anode member defining a second axially extending space therethrough communicating with the first axially extending space at the other end of the anode structure, a plurality of axially extending anode segments on the inner anode member and projecting radially into the second axially extending space and providing a corresponding plurality of axially extending anode recesses therebetween, a plurality of rods respectively disposed in said anode recesses and respectively spaced from the adjacent ones of the anode segments, means electrically interconnecting the anode structure and the rods at the other end of the anode structure, an axially extending cathode structure disposed in the second axially extending space and cooperating with the inner anode member to define an axially extending annular interaction space, the cathode structure including an electron emissive element disposed within the inner anode member and adjacent to the inner portion of the interaction space, means for establishing a unidirectional magnetic field extending axially through the first axially extending space and the interaction space, and end structures enclosing both the ends of the anode structure and the axially extending spaces, the anode structure and the rods and the interconnecting means defining a frequency determining folded resonant cavity for the device.

Another object of the invention is to provide an improved crossed-field discharge device of the type set forth, wherein the rods are mounted on a plate positioned adjacent to the other end of the anode structure, the rods extending from the plate in cantilever fashion and corresponding in number to the anode recesses and disposed therein and respectively spaced from the adjacent ones of the anode segments.

In connection with the foregoing object, another object of the invention is to provide a crossed-field discharge device of the type set forth wherein the longitudinal axis of each of the rods is disposed substantially parallel to the longitudinal axes of the cathode structure and the interaction space, the cross sections of each of the rods being small compared to the longitudinal extent thereof whereby the major dimension thereof is in a direction parallel to the axes of the cathode structure and the interaction space, thus to avoid changes in the spacing between the rods and the cathode structure due to thermal expansion of the rods.

Another object of the invention is to provide an improved cross-field discharge device of the type set forth wherein the capacitance between the anode structure and the cathode structure is greater than the capacitance between the rods and the cathode structure, thus to produce an RF potential between the anode structure and the cathode structure whereby the cathode structure can be utilized as a probe to extract RF energy from the device.

Another object of the invention is to provide an improved crossed-field discharge device of the type set forth, wherein the cathode structure includes a plurality of circumferentially spaced electron emissive sections corresponding in number to the sum of the number of the anode segments and the number of the rods and disposed within the inner anode member and adjacent to the inner portion of the interaction space.

Another object of the invention is to provide an improved crossed-field discharge device of the type set forth wherein only two electrically insulating seals are required and only a single conductor extends outwardly through each of the seals for the device.

Another object of the invention is to provide an improved crossed-field discharge device of the type set forth having an anode structure capable of very large thermal dissipation and having a very low thermal expansion, the anode structure also providing broad band characteristics during the operation thereof in microwave circuits.

A further object of the invention is to provide an improved microwave oscillator incorporating therein a crossed-field discharge device of the present invention, the resonant circuit for the oscillator being in the form of a folded resonant cavity within the device, the folded cavity being of the coaxial conductor type and having a wavelength corresponding to one-fourth wavelength of the operating frequency.

A still further object of the present invention is to provide an improved microwave amplifier incorporating therein a crossed-field discharge device of the present invention.

Further features of the invention pertain to the particular arrangement of the parts of the crossed-field discharge device and of the connection thereof in the microwave oscillator and microwave amplifier circuits, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 2 is a view in vertical section through the oscillator of FIG. 1 and illustrating the circuit connections for the crossed-field discharge device including the magnetic field coils therefor and the coupler and filter construction used therewith;

Figure 6:
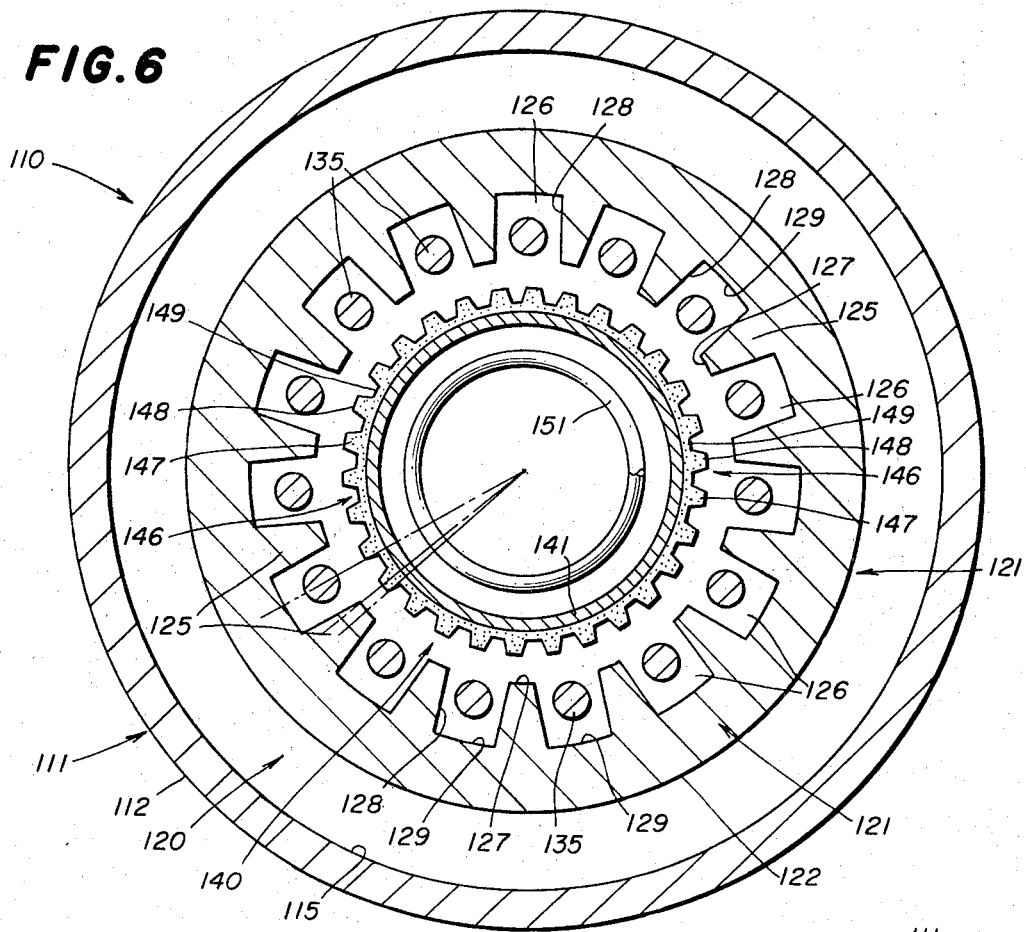
FIG. 6 is an enlarged view in horizontal section through the device of FIG. 3 along the line 6—6 thereof.
Figure 7:
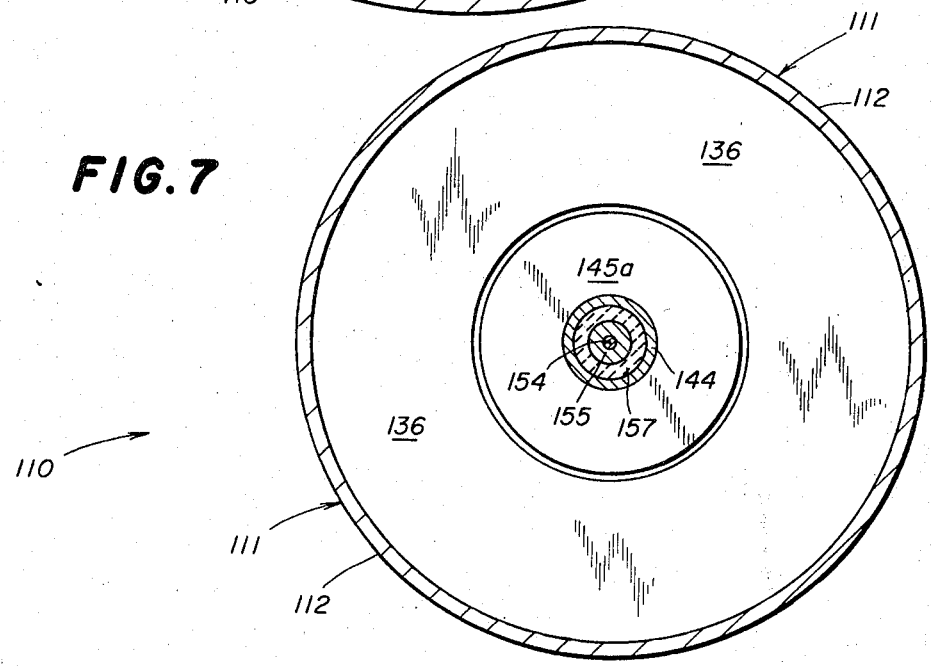
FIG. 7 is a view in horizontal section through the device of FIG. 3 along the line 7—7 thereof.
Figure 14:
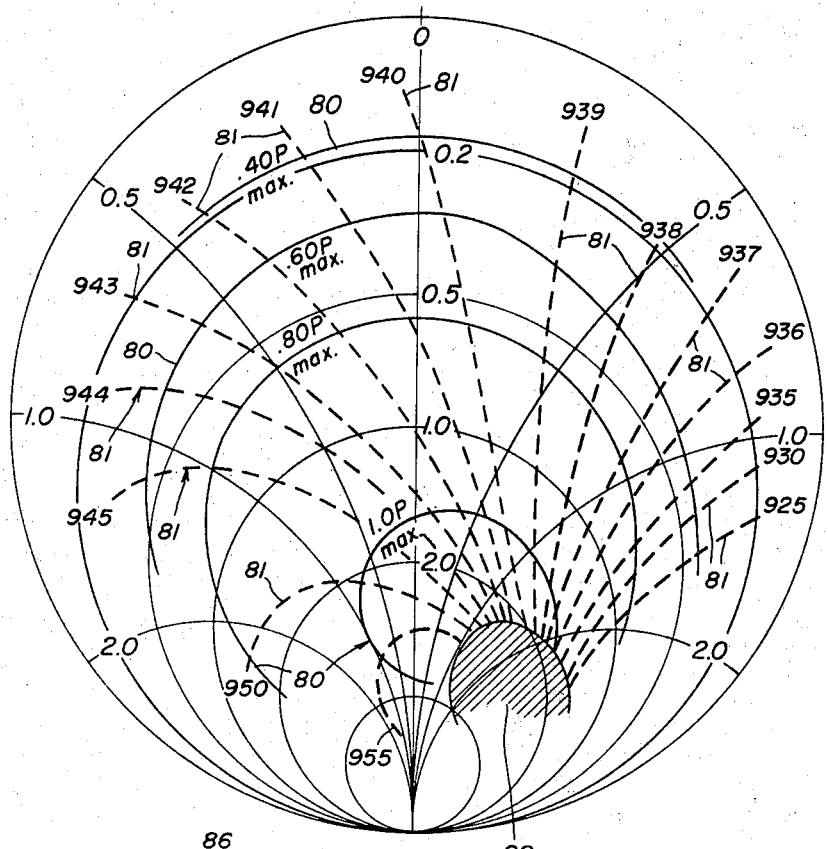
Figure 15:
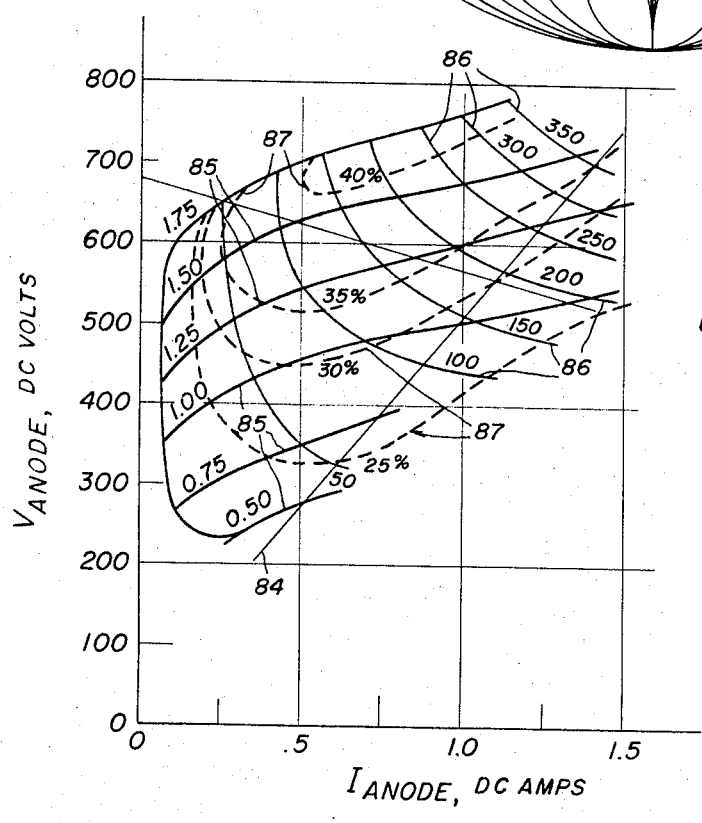
Figure 16:
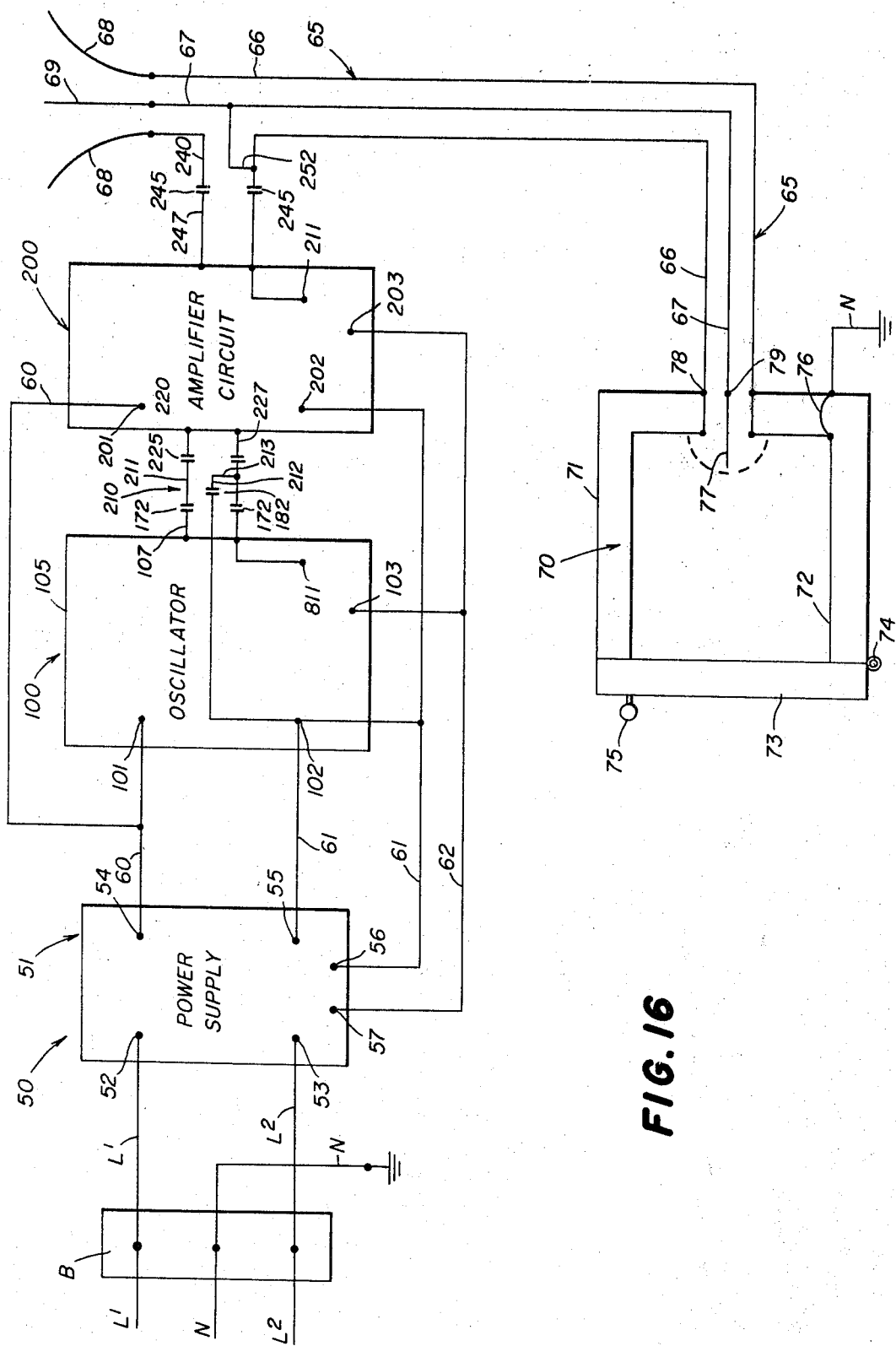

FIGS. 8 to 13, inclusive, are still further enlarged fragmentary views in horizontal section of a portion of FIG. 6 and illustrating the various electrical and magnetic fields present in the device of FIGS. 3 to 7 during the operation thereof;

FIGS. 14 and 15 are graphs plotting several operating characteristics of the crossed-field discharge device illustrated in FIGS. 3 to 7;

FIG. 16 is a schematic and diagrammatic illustration of an amplifying circuit for amplifying the output from the microwave oscillator, the amplifying circuit utilizing therein a crossed-field discharge device made in accordance with and embodying the principles of the present invention; and FIG. 17 is a view in vertical section through the amplifying circuit of FIG. 16 and illustrating the crossed-field discharge device and the circuit connections therefor including the magnetic field coils, and the oscillator input circuits and the output circuits.

Figure 1:
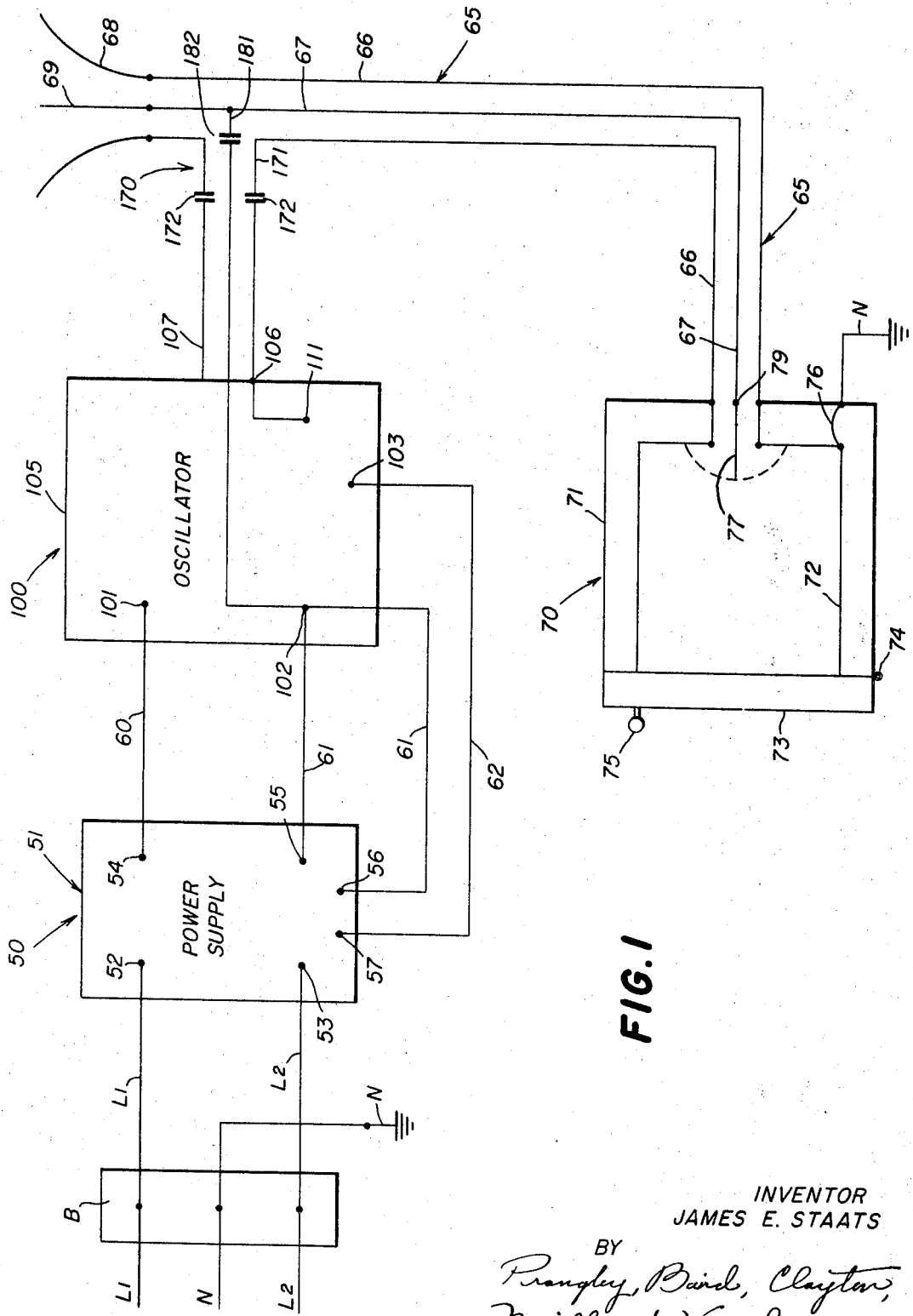
FIGURE 1 is a schematic and diagrammatic illustration of an oscillator circuit incorporating therein a crossed-field discharge device of the present invention.

Referring now to FIG. 1 of the drawings, there is diagrammatically illustrated an oscillator circuit 50 embodying the features of the present invention, the oscillator circuit 50 having been illustrated as connected to a three-wire Edison network of 236 volts, single-phase, 60-cycles AC, and including two ungrounded line conductors L1 and L2 and a grounded neutral conductor N, the three conductors mentioned being terminated at an associated electrical insulating block B. The circuit 50 also comprises a power supply 51 having a pair of input terminals 52 and 53 that are respectively connected to the conductors L1 and L2. A first pair of output terminals 54 and 55 is provided for supplying a rectified and filtered DC voltage of low amplitude for the purpose of applying the DC operating potentials to the crossed-field discharge device of the circuit 50; and a second pair of output terminals 56 and 57 is provided for supplying a relatively low voltage AC power for the purpose of energizing the heater of the crossed-field discharge device of the oscillator circuit 50. More specifically, the input terminals 52 and 53 are connected to the output terminals 54 and 55 by a converter, the converter preferably being of the type disclosed in the copending application of James E. Staats, Ser. No. 181,144, filed Mar. 20, 1962, wherein there is disclosed a converter comprising an assembly of capacitors and rectifiers connected between the input terminals and output terminals thereof, and characterized by the production of a DC output voltage across the output terminals thereof in response to the application of the low frequency AC input thereto across the input terminals thereof, whereby the amplitude of the DC output therebetween from the converter is approximately twice the peak value of the AC voltage to the converter. The converter described is in fact a voltage doubler and rectifier circuit wherein the output DC potential therefrom at the terminals 54 and 55 is approximately 666 volts when the AC supply source has a R.M.S. voltage of 236 volts between the conductors L1 and L2, the 666 volts DC being the open circuit or no-load value for the DC output from the power supply 51.

The oscillator circuit 50 further comprises an oscillator 100 incorporating therein a crossed-field discharge device made in accordance with and embodying the principles of the present invention, the oscillator 100 having a pair of input terminals 101 and 102 that are connected respectively to the DC output terminals 54 and 55 of the power supply 51 by means of conductors 60 and 61, respectively; the input terminal 102 is also connected by the conductor 61 to one of the low voltage AC output terminals 56 of the power supply 51. A third input terminal 103 is provided for the oscillator 100, the input terminal 103 being connected by a conductor 62 to the other low voltage AC output terminal 57 of the power supply 51. As illustrated, all of the parts of the oscillator 100 are surrounded by a metallic casing 105 to which is connected as at 106 an outer tubular conductor 107 within which is disposed an inner conductor from the input terminal 102 that forms one of the output connections for the oscillator 100. Another output connection is provided for the oscillator 100 to an anode member 111 on the crossed-field discharge device, the anode member 111 being connected to the metallic casing 105 by the connection 106 and thus to the outer conductor 107. Connection is made to an output transmission line 65 including an outer tubular conductor 66 and the inner conductor 67 disposed therein, a first capacitive coupler being provided by the coupler 172 between the outer conductor 107 and the outer conductor 66, and a second capacitive coupling being provided by the coupler 182 between the terminal 102 and the inner conductor 67. The capacitive coupling provided by the couplers 172 and 182 is desirable and necessary since for safety purposes the outer conductor 66 of the transmission line 65 must be grounded, which grounding of the outer conductor 66 is not possible if there is a DC connection to the oscillator casing 105, the casing 105 having a potential with respect to ground because of the application of operating potentials from the voltage doubler and rectifier circuit 51, it being inherent in the construction and operation of the circuit 51 that neither the conductor 60 nor the conductor 61 can be grounded. Accordingly, it is also necessary and desirable that the power supply 51 and the oscillator 100 be electrically shielded by a grounded outer housing (not shown) disposed therearound, all as is fully described in the aforementioned copending application Ser. No. 181,144.

The microwave energy supplied from the oscillator 100 to the transmission line 65 may be used for any desired purpose, two typical uses of the microwave energy being illustrated in FIG. 1, the first use being illustrated in the upper righthand portion of FIG. 1 and the second use being illustrated in the lower portion of FIG. 1. Referring to the upper righthand portion of FIG. 1, in the first use of the microwave energy illustrated therein the transmission line 65 is coupled to an antenna of the type commonly used in search radar, the outer conductor 66 being connected to the outer radiating or antenna elements 68 and the inner conductor 67 being connected to an inner radiating or antenna element 69, the antenna elements 68 and 69 serving to match the impendance of the transmission line 65 to the impedance of the atmosphere. In the second use of the microwave energy illustrated in FIG. 1, the transmission line 65 is shown coupled to an electronic heating apparatus, such as the electronic range 70 illustrated that is essentially designed for home use. More particularly, the range 70 comprises an upstanding substantially box-like casing 71 formed of steel and housing therein a metal lining 72 defining a heating cavity therefor. The metal lining 72 may also be formed of steel, and essentially comprises a box-like structure provided with a top wall, a bottom wall, a rear wall and a pair of opposed side walls, whereby the liner 72 is provided with an upstanding front opening into the heating cavity defined therein, the casing 71 being provided with a front door 73 arranged in the front opening thus formed cooperating with the liner 72. More particularly, the front door 73 is mounted adjacent to the lower end thereof upon associated hinge structure 74, and is provided adjacent to the upper end thereof with a handle 75, whereby the front door 73 is movable between a substantially vertical closed position and a substantially horizontal open position with respect to the front opening provided in the liner 72. Also the front door 73 has an inner metal sheet that is formed of steel and cooperates with the liner 72 entirely to close the heating cavity when the front door 73 occupies its closed position. For safety purposes, the inner liner 72 is connected by a conductor 76 to the outer casing 71 which is in turn grounded by the conductor N. The outer conductor 66 of the tranmission line 65 is connected as at 78 to the casing 71 and the liner 72 of the range 70, and there is provided within the range 70 at the rear thereof a radiating element or antenna 77 that is connected as at 79 to the inner conductor 67 of the transmission line 65. Accordingly, the microwave energy within the transmission line 65 is radiated into the cooking cavity of the range 70 to provide the power for cooking materials disposed therein. It further will be understood that in a preferred embodiment of the range 70, the power supply 50 and the oscillator 100 therefor together with the transmission line 65 are all preferably disposed within a common housing that also includes the casing 71, the common housing being preferably formed of metal and grounded for safety purposes.

Further details of the construction of the oscillator 100 and the crossed-field discharge device 110 forming a part thereof will now be described with particular reference to FIGS. 2 to 7 of the drawings. The device 110 comprises an anode structure including an outer anode member 111 and an inner anode member 121, a pair of opposed pole pieces 130, a cathode structure 140 and a pair of opposed end structures 160. The outer anode member 111 is generally annular in shape and has a circular cross section, the outer wall 112 thereof being cylindrical, there being provided interiorly of the anode member 111 an axially extending space. A first annular recess is provided in the upper end of the outer anode member 111 as viewed in FIG. 3 terminating in an upper inner end wall 113, and a second annular recess is provided in the lower end of the outer anode member 111 terminating in a lower inner end wall 114. Disposed between the end walls 113 and 114 and disposed interiorly of the outer anode member 111 is a cylindrical inner surface 115.

Disposed within the outer anode member 111 is the inner anode member 121 that is also generally annular in shape, the outer wall 122 therof being cylindrical, there being provided interiorly of the inner anode member 121 a second axially extending space. The upper end of the inner anode member 121 as viewed in FIG. 3 has an outwardly directed flange 123 thereon that is also circular in cross section and has an outer diameter such that it can rest upon the upper inner end wall 113 on the outer anode member 111, the anode members 111 and 121 being both mechanically and electrically interconnected at this juncture. The outer wall 122 on the inner anode member 121 is disposed essentially concentric with respect to the inner surface 115 on the outer anode member 111 to provide an axially extending space 120 therebetween that is terminated at the upper end as viewed in FIG. 3 by the flange 123 and which at the lower end communicates with the axially extending space through the center of the inner anode member 121 as will be described more fully hereinafter. Provided on the inner surface of the inner anode member 121 and extending the entire length thereof is a plurality of axially extending anode segments 125 (see FIG. 6 also) that project radially inwardly into the axially extending space within the anode member 121 and providing therebetween a corresponding plurality of axially extending anode recesses 126, fifteen of the anode segments 125 and fifteen of the corresponding recesses 126 being provided in the inner anode member 121 as illustrated. Each of the anode segments 125 has an axially extending inner surface 127 and a pair of outwardly directed side walls 128 on the opposite sides thereof, the circumferential extent of the inner surface 127 being substantially less than the radial extent of the associated side walls 128. The outer ends of the side walls 128 are joined by an outer wall 129, whereby the recesses 126 are defined by the associated side walls 128 and the associated outer wall 129, the side walls 128 of each recess 126 being disposed substantially parallel to each other and substantially normal to the associated outer wall 129, whereby each of the recesses 126 is substantially square in cross section. The anode members 111 and 121 are formed of a metal having good electrical conductivity and good thermal conductivity, the preferred material of construction being copper.

As will be described hereinafter, the outer anode member 111 forms the outer wall of the device 110 and it is necessary to maintain a low pressure within the device 110, whereby the usual exhaust tubulation 118 is provided in the outer anode member 111 through which the device 110 is evacuated to a high degree. In order to remove heat from the anode structure during the operation of the device 110, there is mounted upon the outer anode member 111 a stacked array of cooling fins 119, ten of the fins 119 being illustrated in FIG. 2 extending outwardly and radially with respect to the outer anode member 111. The fins 119 are preferably formed of a good heat conducting material such as copper and are in both mechanical and heat transfer relationship with the outer anode member 111, the fins 119 preferably being brazed upon the outer anode member 111. The shape of the fins 119 is substantially rectangular so that they fit within the casing 105, there preferably being provided means for passing a cooling fluid, such as a stream of air through the casing 105 and over the fins 119 to effect cooling thereof and a consequent removal of heat from the anode structure and the other parts of the device 110 during the operation thereof.

Mounted within the outer ends of the outer anode member 111 are the pole pieces 130, the pole pieces 130 being identical in construction, whereby the same reference numerals have been applied to like parts of both of the pole pieces 130. The pole pieces 130 are formed of a material having high magnetic permeability, such as soft iron, and are copper plated to render the outer surfaces thereof highly conductive to RF energy. As illustrated, each of the pole pieces 130 is generally cylindrical in shape including an annular outer wall 131 having an outer diameter only slightly less than the inner diameter of the associated recessed end of the anode member 111 and snugly fitting therein and mechanically secured thereto and hermetically sealed therewith. The inner end of the annular outer wall 131 carries an inwardly directed plate 132, the plate 132 of the upper pole piece 130 being disposed against the flange 123 of the inner anode member 121, and the plate 132 of the lower pole piece 130 being spaced a short distance away from the end wall 114 and the lower end of the inner anode member 121. Each of the pole pieces 130 carries an axially directed flange 133 adjacent to the inner periphery of the associated plate 132, each of the flanges 133 having an annular opening therethrough and being provided with an annular recess 134 therein for cooperation with an end seal as will be described more fully hereinafter. It will be seen that the pole pieces 130 are positioned to distribute the magnetic field therebetween through the axially extending spaces defined within the anode structure of the device 110.

There also is provided between the upper surface of the lower pole piece 130 and the lower end wall 114 an annular plate 136 in which is formed fifteen openings receiving therein respectively the lower ends of fifteen rods 135, each of the rods 135 being firmly secured to the plate 136, whereby each of the rods extends upwardly therefrom and in cantilever fashion with the axes of the rods parallel one to the other. The rods 135 are preferably formed of Nichrome alloy and are copper plated to improve the conductivity of the exposed surfaces thereof. Referring also to FIG. 6 it will be seen that one of the rods 135 is disposed in each of the recesses 126, respectively, and positioned as illustrated therein. More particularly, the rods 135 are cylindrical in shape and circular in cross section, the diameter of each of the rods 135 being approximately equal to one-half of the dimensions of the associated recess 126, each of the rods 135 being disposed midway between the side walls 128 of the associated recess 126 and being disposed with the inner surface thereof positioned radially outwardly a slight distance of a surface on which would lie the inner surfaces 127 of the anode segments 125, the rods 135 being disposed radially outwardly a distance of approximately 0.008 inch in a typical construction, whereby each of the rods 135 is completely disposed within the associated recess 126 and the lower end thereof extends into and is fixedly secured to the plate 136.

The pole pieces 130 (and also the plate 136 in the case of the lower pole piece 130) arranged adjacent to the opposite ends of the anode are utilized for establishing a unidirectional magnetic field extending axially through the spaces within the anode structure, and specifically through an axially extending space 120 between the outer anode member 111 and the inner anode member 121, and through an interaction space 150 defined between the inner anode member 121 and the cathode structure 140. To this end a pair of magnet coils 116 is provided, one of the magnet coils 116 being disposed about the upper end of the device 110 as viewed in FIG. 2 and the other magnet coil 116 being disposed about the lower end of the device 110 as viewed in FIG. 2. The magnet coils 116 are both shaped as a torous, are wound of electrically conductive wire, and as illustrated, are disposed respectively about magnet yokes 117 that are in the form of cylinders each disposed within the opening in the associated magnet coil 116. There further are provided outwardly extending flanges 137 respectively about the outer ends of the yokes 117 and secured thereto, the casing 105 being disposed within the flanges 137 and forming a mechanical connection and a good magnetic path therebetween. Disposed within the upper magnet yoke 117 is the outer conductor 107, the outer conductor 107 being formed as two telescoping sections 107a and 107b telescopically interconnected as at 107c. As may be best seen in FIGS. 2 and 3, the outer conductor 107 extends downwardly and fits over the upstanding flange 133 on the upper pole piece 130, a recess 107d being provided therein for this purpose. The upper end of the outer conductor 107 extends upwardly beyond the associated yoke flange 137 and connects to the output transmission line 170 which in turn connects to the transmission line 65. Disposed within the lower magnet yoke 117 is the outer conductor 108, the outer conductor 108 being formed as two telescoping sections 108a and 108b telescopically interconnected as at 108c. As may be best seen in FIGS. 2 and 3, the outer conductor 108 extends upwardly and fits over the downwardly extending flange 133 on the lower pole piece 130, a recess 108d being provided therein for this purpose. The lower end of the outer conductor 108 extends downwardly beyond the associated yoke flange 137. It will be understood that the pole pieces 130, the magnetic yokes 117, the flanges 137, the outer conductors 107 and 108 and the casing 105 are all formed of metals having a high magnetic permeability, such as iron and steel, whereby when the magnet coils 116 are energized, a strong and uniform unidirectional magnetic field is established between the pole pieces 130 within the device 110 and extending axially through the outer space 120 and the interaction space 150 therein.

The circuit for energizing the coils 116 can be traced with reference to FIGS. 1 and 2 from the power supply 51, and specifically the DC output terminal 54 thereof, through the conductor 60 to the input terminal 101 of the oscillator 100 to which is connected one terminal of the upper magnet coil 116. The other terminal of the upper magnet coil 116 is connected by a conductor 138 to one terminal of the lower magnet coil 116, and the other terminal of the lower magnet coil 116 is connected by a conductor 139 to one of the cooling fins 119, whereby the input terminal 101 is connected via the upper magnet coil 116, the conductor 138, the lower magnet coil 116, the conductor 139, and the upper fin 119 to the outer anode member 111 of the device 110. The flow of current through the magnet coils 116 serves to produce the unidirectional magnetic field in the outer space 120 and the interaction space 150 of the crossed-field discharge device 110.

Figure 3:
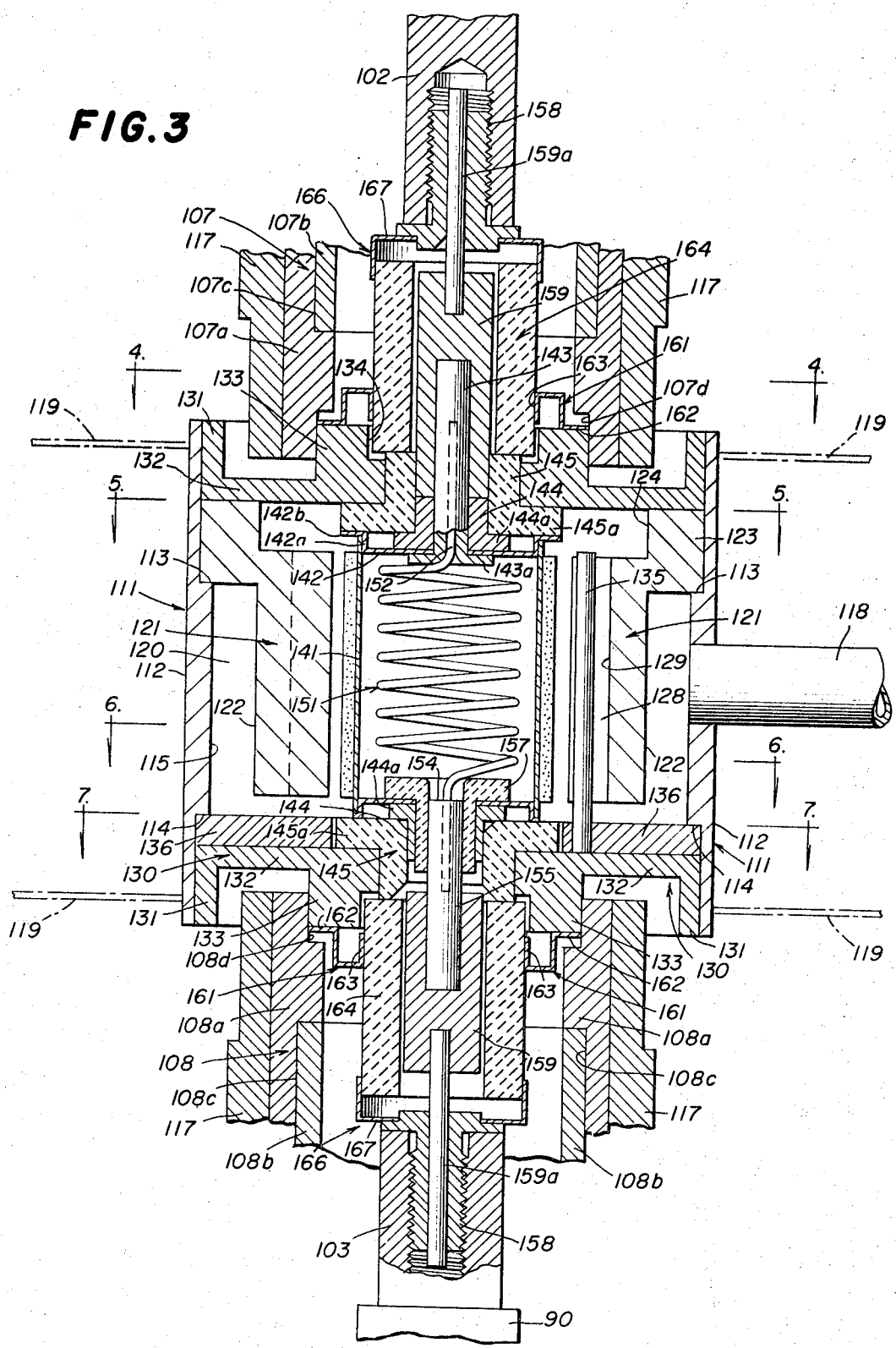
FIG. 3 is an enlarged view in vertical section through the crossed-field discharge device illustrated in the oscillator of FIG. 2.
Figure 4:
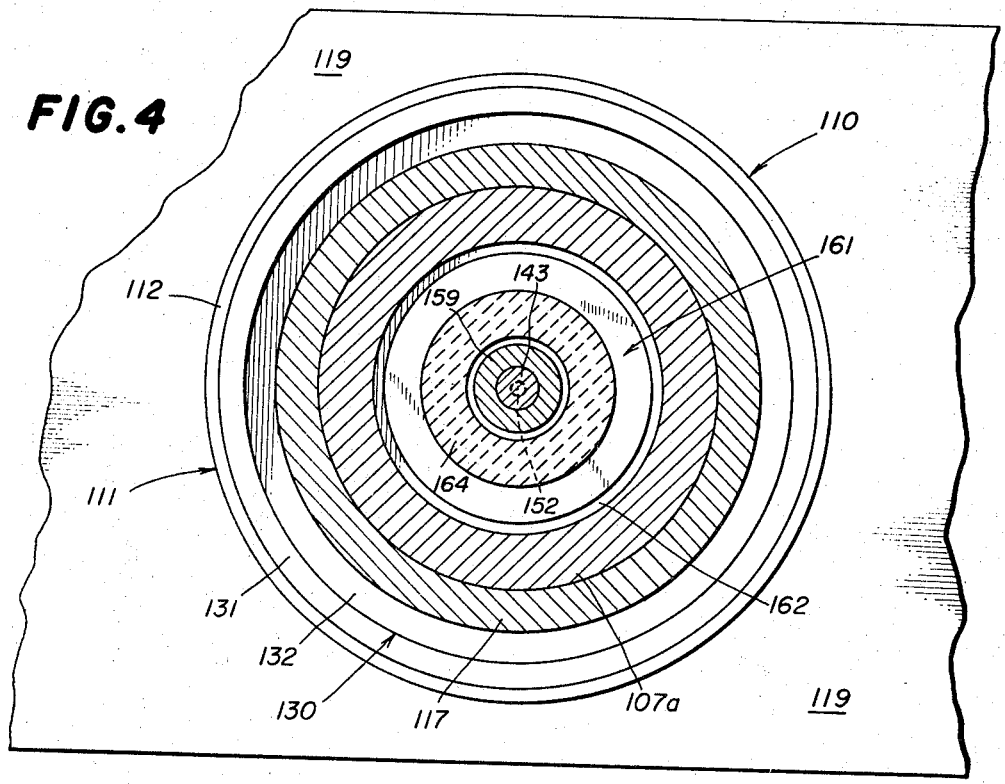
FIG. 4 is a view in horizontal section through the device of FIG. 3 along the line 4—4 thereof.
Figure 5:
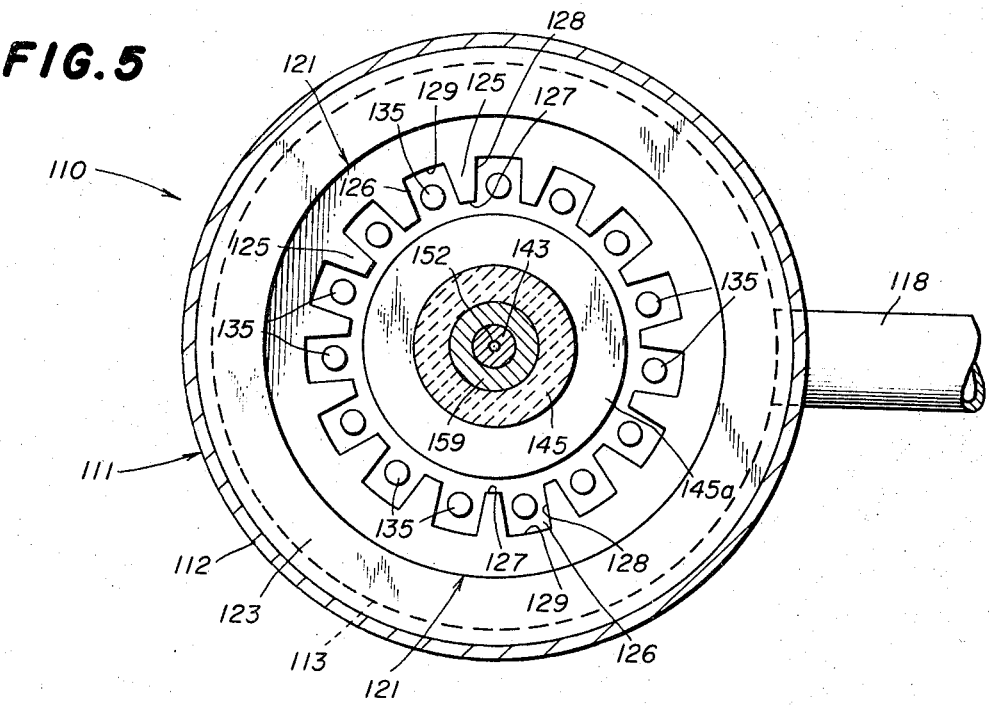
FIG. 5 is a view in horizontal section through the device of FIG. 3 along the line 5—5 thereof.

The cathode structure 140 is provided in the axially extending space defined by the inner anode member 121, the cathode structure 140 including a cylindrical wall 141 (see FIGS. 3 and 6) arranged with the axis thereof disposed at the axis of the anode members 111 and 121, the wall 141 being formed of a heat resistant and electrically conducting material, the preferred material of construction being nickel. Mounted on and substantially closing the opposite ends of the side wall 141 are two end walls 142, the end walls 142 being identical in construction, whereby the same reference numerals have been applied to like parts of both. Each of the end walls 142 includes an axially extending flange 142a that fits within and is preferably connected as by welding to the adjacent end of the side walls 141, an outwardly directed flange 142b integral with the outer end of the flange 142a extending radially therefrom and outwardly beyond the outer surface of the side wall 141. The end walls 142 are also formed of a heat resistant and electrically conducting material, the preferred materials of construction being nickel. The upper end wall 142 as seen in FIG. 3 has a centrally disposed opening therein in which is disposed a conductor 143 extending upwardly therethrough and having extending radially from the lower end thereof an outwardly directed flange 143a disposed against the lower surface of the upper end wall 142. Disposed about the portion of the conductor 143 extending above the end wall 142 is a first bushing 144 having a flange 144a extending outwardly therefrom with the upper surface thereof in general alignment with the upper surface of the flnage 142b. The lower end wall 142 likewise has an opening centrally therein about which is disposed a second bushing 144 having a flange 144a thereon extending outwardly therefrom with the lower surface thereof in general alignment with the lower surface of the associated flange 142b. In order mechanically to mount the cathode structure 140 with respect to the anode structure, the pole pieces 130 and the anode rods 135 while maintaining electrical insulation with respect thereto, an insulator 145 is disposed at each end thereof about the associated bushing 144 and extending through the opening in the associated pole piece 130. The inner ends of the insulators 145 carry radially and outwardly extending flanges 145a that overlie the adjacent flange 142b and the adjacent inner surface of the associated pole piece 130 to maintain the spacing therebetween and to establish an insulation therebetween. As a consequence of the cooperation among the pole pieces 130, the end wall flanges 142b, the insulators 145 and the outwardly extending flanges 145a thereof, the cathode structure 140 is firmly and fixedly mounted with respect to the inner anode member 121, and the pole pieces 130 and the rods 135, while being fully electrically insulated therefrom.

The cathode wall 141 is provided with a sintered porous coating 146 impregnated with a suitable electron emissive oxide material, whereby upon heating of the cathode structure 140, the coating 146 readily emits electrons from the outer surface thereof. Referring particularly to FIG. 6, it will be seen that the coating 146 is shaped to provide a plurality of outwardly extending projections 147 each having outwardly converging side walls joining a generally circumferentially arranged outer surface 148, a space 149 being provided between adjacent projections 147. As illustrated, the circumferential extent of the outer surface 148 is substantially equal to the spacing 149 between the adjacent projections 147. The preferred range of the circumferential extent of each of the outer surfaces 148 is approximately 25% to 60% of the circumferential distance between the centers of adjacent outer surfaces 148. The radial dimension of each of the projections 147 is also preferably greater than about 20% of the spacing between the inner anode member 121 and the coating 146 on the cathode structure 140. The number of projections 147 provided on the coating 146 is equal to the sum of the number of anode segments 125 and the number of rods 135, whereby there are 30 of the projections 147 provided upon the coating 146. The outer surfaces of the coating 146 together with the inner surfaces of the inner anode member 121 define the interaction space 150 disposed therebetween in which the emitted electrons from the coating 146 interact with the electrical fields and the magnetic fields disposed between the inner anode member 121 and the cathode structure 140. As will be described more fully hereinafter, the projections 147 combine with the anode segments 125 and the rods 135 to provide a preferred distribution of the several fields within the interaction space 150 of the device 110 that results in more desirable operating characteristics thereof. One particularly desirable result of the shape of the coating 146 as described is the minimized back heating of the cathode structure 140, the desirable emitted electrons emanating from the projections 147, and the undesirable emitted electrons emanating from the space 149 between the projections 147, thereby to facilitate the emission of desirable electrons and to suppress the emission of undesirable electrons.

It further will be noted from FIG. 6 that the center line of each projection 147 is circumferentially displaced relative to the center line of its corresponding anode segment 125 or rod 135, as the case may be; more specifically, the center lines of the projections 147 are displaced in a clockwise direction a circumferential distance equal to approximately 40% of the circumferential spacing between the center lines of an adjacent anode segment 125 and an adjacent rod 135. The circumferential displacement of the projections 147 with respect to the corresponding anode segment 125 or rod 135 is preferably in the range between 0% and approximately 45% of the circumferential spacing between adjacent anode segments and rods, a preferred range being between approximately 25% and 45% of the spacing between adjacent anode segments and rods, a still more preferred range being between approximately 35% and 45% of the spacing between adjacent anode segments and rods. Furthermore, the displacement is on the downstream side, i.e., in the direction of normal initial electron flow from the projections 147. Finally, it will be noted that the electron emissive coating 146 is confined between the end walls of the inner anode member 121, the cathode structure 140 being carefully centered with respect to the inner anode member 121 and the rods 135, whereby each of the cathode projections 147 extends axially of the device 110 parallel to the axis thereof and confined between the end walls of the inner anode member 121.

As illustrated, the cathode structure 140 is of the indirectly heated type, and accordingly, there has been provided within the cathode wall 141 a heater 151 in the form of a coiled filament extending substantially the entire length of the cathode wall 141 and spaced inwardly a short distance from the inner surface thereof. The upper end of the heater 151 as viewed in FIG. 3 has an outer end 152 that extends outwardly into an opening in the lower end of the conductor 143 and is mechanically and electrically connected thereto, whereby the cathode structure 140 and the heater 151 are both mechanically and electrically connected to the conductor 143. The lower end of the heater 151 has an outer end 154 that extends into an opening in the upper end of a conductor 155 and is mechanically and electrically secured thereto. The conductor 155 is preferably formed of copper and extends downwardly through and spaced from the associated bushing 144 and through and spaced from the associated insulator 145 and outwardly therebeyond. There further is provided an insulating bushing 157, formed preferably of ceramic, that surrounds the upper end of the conductor 155 and is disposed between the conductive bushing 144 and the conductor 155 to provide electrical insulation therebetween.

The uppermost end of the conductor 143 is connected to an upper connector 158 by means of a pair of interconnected conductors 159 and 159a extending therebetween, whereby the upper connector 158 is in good electrical connection with both the upper end of the cathode structure 140 and the upper end of the heater 151 for supplying electrical energy thereto. The lower end of the conductor 155 is connected to a lower connector 158 by means of a pair of interconnected conductors 159 and 159a extending therebetween, whereby the lower connector 158 is in good electrical connection with the lower end of the heater 151 for supplying electrical energy thereto, but is electrically insulated from the lower end of the cathode structure 140.

A pair of identical end structures 160 is provided at the opposite ends of the device 110, the end structures 160 serving to provide a hermetic seal between the adjacent pole piece 130 and the adjacent connector 158 at the upper and lower ends of the device 110 as viewed in FIG. 3. Since the end structures 160 are identical in construction, only one will be described in detail, like reference numerals being applied to like parts of both of the end structures 160. A first seal member 161 is provided formed of a good electrical conducting material that is non-magnetic and of the type that can be readily secured both to a metal surface and to a ceramic surface the preferred material being "Fernico" alloy, a typical composition being 54% iron, 28% nickel and 18% cobalt. The seal member 161 is generally cylindrical in shape and has an outwardly directed flange 162 on the inner end thereof that rests upon the exposed end of the adjacent pole piece flange 133 and is hermetically sealed thereto as by brazing. An inturned and re-entrantly directed flange 163 is formed on the seal member 161 and completely surrounds an associated insulator 164 that surrounds the outer end of the associated conductor 159, the insulators 164 preferably being formed of ceramic. The flange 163 is hermetically sealed to the exterior cylindrical surface of the associated insulator 164, whereby to form a hermetic seal between each pole piece flange 133 and the associated insulator 164 and to provide mechanical interconnection therebetween as well as providing electrical insulation therebetween. The outer end of each of the insulators 164 is provided with a seal number 166 generally cylindrical in shape and surrounding the outer end of the associated insulator 164. Both of the seal members 166 are formed of a good electrically conducting material that is non-magnetic and of the type which can be readily hermetically sealed both to a metal surface and to a ceramic surface, the preferred material being "Fernico" alloy. Each of the seal members 166 surrounds and embraces the adjacent end of the associated insulator 164 and is hermetically sealed thereto. The outer end of each of the seal members 166 carries an inwardly directed flange 167 that overlies the outer end of the associated insulator 164 and surrounds and embraces the shank of the associated connector 158 and is hermetically sealed thereto, whereby each seal member 166 hermetically seals between the associated insulator 164 and the associated connector 158. It will be understood that each end structure 160 hermetically seals the associated end of the device 110 and also provides electrical insulation between the parts where necessary while providing for mechanical support therebetween.

Referring now to FIG. 2 of the drawings, the manner in which the crossed-field discharge device 110 is incorporated in the oscillator 100 will be described in further detail. The tubular conductor 107 is provided formed of a material that is electrically conductive, the conductor 107 having a recess 107d in the lower end thereof that receives the upper pole piece flange 133 therein in telescoping relation therewith and is electrically connected thereto, the conductor 107 also being disposed within the upper magnetic yoke 117 and extending upwardly and beyond the upper end thereof. As is illustrated in both FIGS. 2 and 3, the connector 158 at the upper end of the crossed-field discharge device 110 has the outer external surfaces thereof threaded and extends into a complementarily threaded opening in the lower end of the terminal 102, whereby a good electrical connection is provided between the connector 158 and the terminal 102. The upper end of the terminal 102 is disposed below the outer end of the associated magnet yoke 117.

The terminal 102 and the conductor 107 form a coaxial transmission line that provides output RF terminals for the oscillator 100, the terminals having applied therebetween the output RF energy from the oscillator 100. In addition, the outer conductor 107 has applied thereto the B+ potential from the conductor 60 which is connected thereto via the input terminal 10, the upper magnet coil 116, the conductor 138, the lower magnet coil 116, the conductor 139, the uppermost cooling fin 119, the outer anode member 111 and the upper pole piece 130, the upper pole piece 130 being directly connected to the lower end of the outer conductor 107 as illustrated. Accordingly, it will be seen that the outer conductor 107 not only serves as one of the RF terminals from the device 110 but also is in direct electrical connection with the B+ potential on the outer anode member 111. Likewise, the terminal 102 not only has RF output energy thereon but has applied thereto both the B− potential for the cathode 140 of the device 110 and the low voltage AC potential for energizing the heater 151.

In order to accommodate the application to and the presence of the various potentials named on the output terminals 102 and 107 while preventing the introduction of RF energy into the power supply 51, and while preventing the application of the B+ and B− potentials to the output transmission line 65, there has been provided a coupler and filter structure 170. Referring to FIG. 2, it will be seen that the coupler and filter structure 170 includes a first RF output terminal in the form of an annular outer conductor 171 which is capacitively coupled to the conductor 107 by a coupler 172, the coupler 172 including a sleeve 173 of electrically insulating dielectric material, the sleeve 173 preferably being formed of a synthetic organic plastic resin, the preferred resin being a tetrafluoroethylene resin sold under the trademark "Teflon." The insulating sleeve 173 is disposed around and firmly embraces the outermost end of the tubular conductor 107 and extends upwardly therebeyond; the lower end of the outer conductor 171 is in turn placed in telescoping relationship about the sleeve 173, the lower end of the conductor 171 telescopically overlapping the upper end of the conductor 107 for a distance equal to ¼ of the wavelength of the frequency of operation of the oscillator 100 in order to provide a portion of a second harmonic filter as will be described more fully hereinafter.

An opening is provided in the side wall of the conductor 107 adjacent to the upper end of the oscillator 100, and joining the conductor 107 and surrounding the opening in the side wall thereof is a second annular conductor 174 that is suitably secured as by welding to the conductor 107 and extends laterally therefrom and to the right as viewed in FIG. 2 with the longitudinal axes of the conductor 107 and 174 disposed substantially normal to each other. Disposed in the conductor 107 adjacent to the junction thereof with the conductor 174 is a pair of annular insulators 175 and 176 substantially filling the conductor 107 and spaced apart a short distance from each other, the insulators 175 and 176 being formed of an electrically insulating dielectric material, the preferred material being a synthetic organic plastic resin, the preferred resin being a tetrafluoroethylene resin sold under the trademark "Teflon." The lower insulator 175 has an opening centrally therein that receives therethrough a portion of a bullet 177 having on the lower end thereof a plurality of spring fingers 177a that resiliently grip the upper end of the terminal 102 to form a good electrical contact and mechanical interconnection therewith, a laterally extending flange 177b extending around the bullet 177 and being disposed below and in supporting relationship with the insulator 175.

Extending upwardly through an opening in the center of the bullet 177 is a probe 178 in the form of a solid rod of electrically conductive material, the preferred material being copper. The probe 178 passes through an opening in the center of the insulator 176 and upwardly therebeyond, the insulator 176 having an upstanding flange 176a surrounding the probe 178. A suitable fastener such as a screw 179 is provided at the lower end of the probe 178 and threadedly engages a complementarily threaded opening at the lower end thereof, the head of the screw 179 overlying the lower surface of the bullet 177. Arranged about and in telescoping relationship with the upper end of the probe 178 is an annular inner conductor 180 that has the lower end resting upon the insulator 176 and surrounding the upstanding flange 176a thereon, the upper end of the conductor 180 having an enlarged section 180a thereon that extends upwardly well beyond the probe 178 and telescopically receives therein a second tubular inner conductor 181 that serves as an RF output terminal for the coupler and filter structure 170, whereby the conductors 171 and 181 provide the RF output terminals for the coupler and filter structure 170. A capacitive coupling is provided between the probe 178 and the conductors 180 and 181 by a coupler 182 including an annular washer 183 formed of an electrically insulating dielectric material, the preferred material being a synthetic organic plastic resin, the preferred resin being a tetrafluoroethylene resin sold under the trademark "Teflon." The washer 183 surrounds the upper end of the probe 178 and is seated in the enlarged portion 180a at the upper end of the conductor 180 and serves fixedly to position the upper end of the probe 178 with respect to the conductors 180 and 181. A second fastener in the form of a screw 179 is provided in the upper end of the probe 178 and has a threaded shank threadedly engaged in a complementarily shaped threaded opening in the upper end of the probe 178, the head of the screw 179 engaging the upper surface of the insulating washer 183, whereby the two opposed screws 179 serve fixedly to interlock the insulators 175 and 176, the bullet 177, the conductor 180 and the insulating washer 183.

The B− potential and the low voltage AC filament supply for the device 110 are connected to the probe 178 and thus to the device 110 through connections in the conductor 174, and specifically through a conductor 184 disposed within and concentric with the outer conductor 174. The conductor 184 carries on the lefthand end thereof as viewed in FIG. 2 a connector 184a having an opening therein that receives therethrough the probe 178, whereby to make good electrical connection therewith. Disposed about the conductor 184 and between the outer conductor 174 and the inner conductor 184 is an annular insulator 185 formed of an electrically insulating dielectric material, the preferred material being a synthetic organic plastic resin, the preferred resin being a tetrafluoroethylene resin sold under the trademark "Teflon." Disposed to the left of the insulator 185 is an enlargement or flange 184b on the conductor 184, and disposed to the right of the insulator 185 is a cylindrical choke 186 in the form of a tubular conductor that surrounds and receives therethrough the conductor 184 arranged concentrically therewith, the insulator 185 having a laterally extending flange 185a surrounding the conductor 184 and extending into the lefthand end of the choke 186 to position the adjacent end of the choke 186 with respect to the conductor 184. A conductive nut 187 is provided about the conductor 184 adjacent to the righthand end thereof and including a flange 187a extending into the righthand end of the choke 186 to position the adjacent ends of the conductor 184 and the choke 186 with respect to each other. The righthand end of the conductor 184 is threaded as at 184c and threadedly engages an internally threaded opening in the nut 187 to lock the insulator 185 and the choke 186 against the flange 184b; the threaded end 184c is connected to an input terminal 189 formed of a conductive metal, the terminal 189 having an enlarged lefthand end 189a having a threaded opening therein to receive the adjacent threaded end 184c of the conductor 184. The terminal 189 extends outwardly to the right beyond the outer conductor 174 and is connected to the conductor 61 from the power supply 51. Connected between the outer conductor 174 and the inner conductor 189 is a filter capacitor 188 of the feed through type that is in the form of two layers of conductive foil between which are interposed layers of insulating film, the layers of conductive foil and insulating film being wound to form the capacitor 188, one terminal of the capacitor 188 being connected to the outer conductor 174 and the other terminal of the capacitor 188 being connected to the terminal 189.

As has been explained above, the inner conductor 107 and the outer conductor 171 telescopically overlap a distance equal to ¼ wavelength of the frequency of operation of the oscillator 100. In addition, the probe 178, the inner conductor 180 and the choke 186 are also constructed to have a length equal to ¼ wavelength of the frequency of operation of the oscillator 100. In the operation of the coupler and filter structure 170, the outer conductors 107–174 serve as a B+ input terminal, the conductor 107 being directly connected to the conductor 139 by which a B+ is applied to the outer anode member 111, and the terminal 189 serves as the B− input terminal and is connected to the cathode 140 via the conductor 184, the probe 178, the bullet 177, the terminal 102, the connector 158 (see FIG. 3 also), the conductors 159 and 159a and the conductor 143, whereby to apply B− potential to the cathode 140. The terminal 189 also serves as an input terminal for the low voltage AC filament supply and is connected to one end of the filament 151 via the conductor 184, the probe 178, the bullet 177, the terminal 102, the connector 158, and the conductors 159a, 159 and 173, whereby to apply low voltage AC potential to the upper end of the heater 151.

The connector 158 at the lower end of the device 110 (see FIG. 3) is connected to a filter capacitor 90 of the feed through type, and more specifically is connected to the output terminal 103 that has the adjacent end thereof internally threaded and receives the threaded outer end of the terminal 158 therein. The conductor 108 is disposed within the lower magnet yoke 117 and extends downwardly and beyond the lower end thereof. There is provided on the lower end of the conductor 108 a cover 109 formed of conductive metal and including a flange 109a surrounding and in telescoping relationship with the lower end of the conductor 108 and mechanically and electrically secured thereto. Disposed between the terminal 103 and the cover 109 is a filter capacitor 92 of the same type of construction as the filter capacitor 188 described above, one of the terminals of the filter capacitor 92 being connected to the cover 109 and the other terminal of the filter capacitor 92 being connected to the terminal 103, a flange 93 being provided on the exterior of the filter capacitor 92 in overlying relationship with the cover 109. The filter capacitor 92 serves to by-pass RF energy from the terminal 103 to the outer conductor 108 through the cover 109, thereby to prevent the introduction of RF energy into the power supply 51 via the conductor 62.

During the operation of the crossed-field discharge device 110, the anode members 111 and 121 and the rods 130 cooperate to provide a portion of a folded coaxial transmission line within the device 110, the coaxial transmission line thus formed accommodating axially extending RF waves therein. The coaxial transmission line includes an outer section defined by the inner surface 115 on the outer anode member 111 and the outer wall 122 of the inner anode member 121, this outer section being short-circuited at the upper end thereof by the electrical connection between the flange 123 on the inner anode member 121 and the upper end of the outer anode member 111; an inner section of coaxial transmission line is defined by the inner surface of the inner anode member 121 and the rods 135, this inner section being open-circuited and joined at the lower end to the lower end of the outer section. Accordingly, a tuned cavity is provided which can be excited to cause oscillations therein at a frequency equal substantially to four times the length thereof, i.e., four times the distance from the lower surface of the flange 123 and down around the lower end of the inner anode member 121 and up along the rods 135 to the upper ends thereof, whereby to provide an axially extending wave therein that is reflected by the inner surfaces of the flange 123 to produce a standing RF wave within the device 110.

In the operation of the oscillator 100, it is necessary to produce within the crossed-field discharge device 110 a predetermined pattern of electrical fields and magnetic fields. A description of the electrical fields and magnetic fields within the device 110 during the operation thereof as an oscillator and the method of creating those fields will be given. The operating potentials for the device 110 are derived from the power supply 51 described above, and more particularly, the heater supply is derived from the power supply output terminals 56 and 57, the terminal 56 being connected by the conductor 61 to the terminal 189 that is in turn connected by the conductor 184, the probe 178, the terminal 102, the connector 158, the conductors 159 and 159a and the conductor 143 to one end of the heater 151, and the terminal 57 being connected by the conductor 62 to the terminal 103 that is in turn connected via the connector 158, the conductors 159 and 159a and the conductor 155 to the other end of the heater 151. The DC potential from the power supply 51 is derived specifically from the output terminals 54 and 55, the conductor 60 interconnecting the output terminal 54 of the power supply 51 to the input terminal 101 (see FIG. 2 also) which is connected via the upper magnet coil 116, the conductor 138, the lower magnet coil 116, the conductor 139 and the fin 119 to the outer anode member 111 to supply B+ potential thereto, and the conductor 61 interconnecting the output terminal 55 of the power supply 51 to the terminal 189 which is connected via the conductor 184, the probe 178, the terminal 102, the connector 158, the conductors 159 and 159a and the conductor 143 to the cathode 140 to supply B− potential thereto.

The application of the above described B+ and B− potentials to the outer anode member 111 and the cathode 140, respectively, establishes a unidirectional electrical field 190 (see FIG. 8), that extends between the anode segments 125 and the cathode projections 147 and between the rods 135 and the cathode projections 147; it will be noted that each of the projections 147 provides a unidirectional electrical field in cooperation with both an adjacent anode segment 125 and an adjacent rod 135, the field between an anode segment 125 and the associated cathode projections 147 being designated by the numeral 191a and the field between a rod 135 and the associated cathode projections 147 being designated by the numeral 191b. The electrical field 190 extends substantially normal to the longitudinal axis of the inner anode member 121, the field lines entering the surfaces 127 normal thereto, the field lines entering the surfaces of the rods 135 normal thereto and the field lines entering the cathode surfaces 148 normal thereto, whereby the field 190 takes the shape illustrated in FIG. 8.

In order to provide the necessary unidirectional magnetic field normal to or "crossed" with respect to the electrical field 190, a DC current is established in the magnet coils 116. More particularly, electrons flow from the anode structure through the conductor 139, the lower magnet coil 116, the conductor 138, the upper magnet coil 116 and the conductor 60 to the power supply output terminal 54. When such a flow of electrons is established through the magnet coils 116, a strong unidirectional magnetic flux is established through a path including the upper flange 137, the upper magnet yoke 117, the upper pole piece 130 (see FIG. 3 also) and through the space 120 and the interaction space 150, and then through the lower pole piece 130, the lower magnet yoke 117 and the lower flange 137. The return path for the unidirectional magnetic field is provided through the casing 105 which is formed of a material that is magnetically permeable. Referring to FIG. 9 of the drawings, the unidirectional magnetic flux lines extending through the outer space 120 and the interaction space 150 are designated by the numeral 191, the flux line 191 extending axially through the spaces 120 and 150 and therefore normal to the plane of the sheet of drawing in FIG. 9. Due to the provision of the pole pieces 130, and the other portions of the magnetic path having a high magnetic permeability described above, there is a uniform distribution of the unidirectional flux lines 191 throughout the space 120 and throughout the recesses 116 about the rods 130 and inwardly to the outer surface of the electron emissive coating 146. It further is pointed out that the unidirectional magnetic flux lines 191 are disposed normal to the unidirectional electrical field 190 illustrated in FIG. 8, whereby the unidirectional electrical field 190 and the unidirectional magnetic field 191 provide the necessary "crossed" fields for the operation of the crossed-field discharge device 110.

As has been pointed out above, the facing surfaces 115 and 122 of the outer anode member 111 and the inner anode member 121 and the facing surfaces of the inner anode member 121 and the rods 135 cooperate to provide a folded coaxial transmission line, the outer and inner sections of which extend axially with respect to the device 110, the outer section being shorted or terminated at the upper end thereof by the flange 123. The shorted folded transmission line thus provided forms a tuned cavity for the oscillator 100, the tuned cavity being readily excited at a frequency having a wavelength corresponding to four times the distance between the inner surface of the flange 123 and down and around the lower end of the inner anode member 121 and up to the upper ends of the rods 135. When the tuned resonant cavity thus formed is excited by the establishment of the unidirectional electrical field 190 of FIG. 8 and the unidirectional magnetic field 191 of FIG. 9, the tuned cavity resonates at a frequency having the wavelength mentioned, i.e., a standing RF wave is established within the tuned cavity and extends axially thereof and axially of the device 110 and through the outer space 120 and the interaction space 150 thereof. The wavelength of the RF wave thus generated is actually substantially greater than four times the distance between the inner surface of the flange 123 and around the lower end of the inner anode member 121 and up to the upper ends of the rods 135 because of the high capacitance between the inner anode member 111 and the rods 135, which high capacitance is in the tuned circuit and serves to permit the generation of RF waves in the device 110 having wavelengths substantially greater than four times the distance mentioned.

Figure 10:
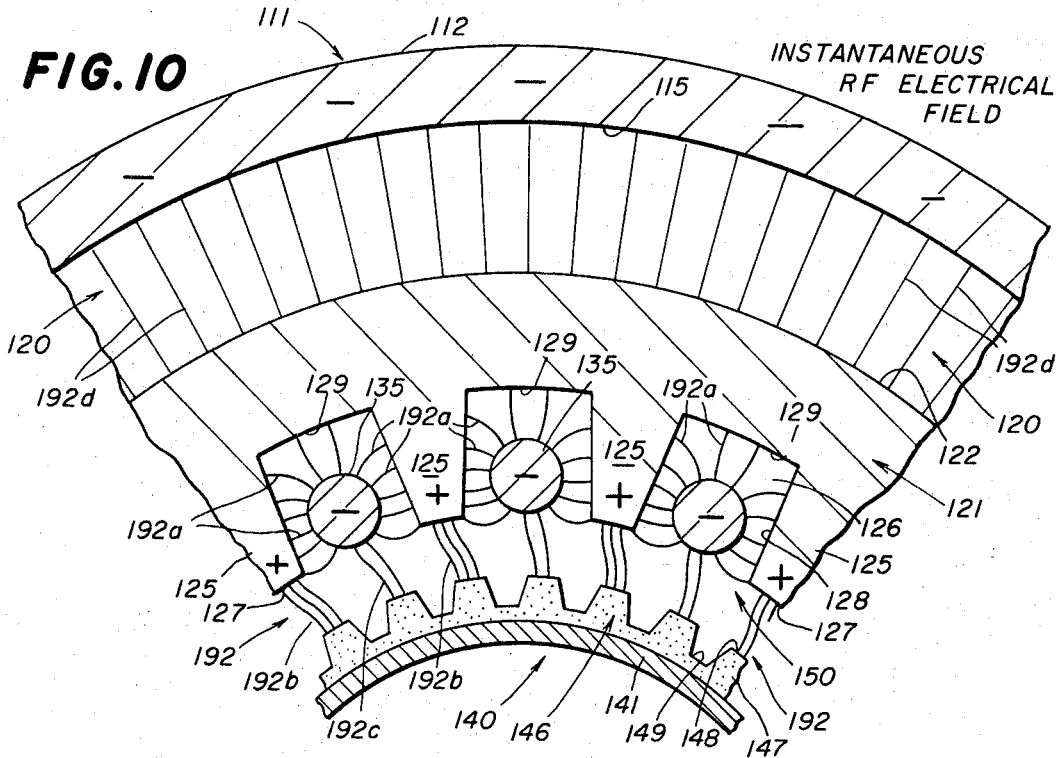

There is believed to be associated with the standing RF wave thus established an RF electrical field disposed normal to the axis of the device 110, a diagrammatic representation of the field being illustrated in FIG. 10. From FIG. 10, it will be seen that at any moment the anode segments 125 have one RF polarity while the rods 135 have the opposite RF polarity, whereby there is a relatively strong RF electrical field between the inner anode member 121 and the rods 135 as well as weak RF electrical fields between the inner anode member 121 and the cathode 140 and between the rods 135 and the cathode 140. The outer anode member 111 also has an RF polarity opposite to that of the inner anode member 121, whereby there is an RF electrical field therebetween. In FIG. 10, the instantaneous RF electrical field has been designated by the numeral 192, and the stronger portion thereof disposed between the inner anode member 121 and the rods 135 has been designated 192a, the force lines being disposed normal to the surfaces associated therewith, i.e., normal to the side walls 128 and the outer wall 129 of the recesses 126 and the surfaces of the rods 135. There is a weaker portion of the RF electrical field disposed between the inner anode member 121 and the cathode 140, that portion of the field being designated by the numeral 192b, the lines representing the portion 192b of the field being normal to the inner surfaces 127 of the anode segments 125 and normal to the outer surfaces 148 of the cathode projections 147. There is a still weaker portion of the RF electrical field 192 between the rods 135 and the cathode 140, that portion of the field being designated by the numeral 192c, the lines representing the portion 192c of the field also being disposed normal to the associated surfaces, and specifically normal to the outer surfaces of the rods 135 and normal to the outer surfaces 148 of the associated cathode projections 147. Finally, there is a portion of the RF electrical field 192 between the anode members 111 and 121 in the space 120, that portion of the field being designated by the numeral 192d, the lines representing the portion 192d of the field being disposed normal to the associated surfaces and specifically normal to the inner surface 115 of the anode member 111 and the outer surface 122 of the anode member 121.

Figure 11:
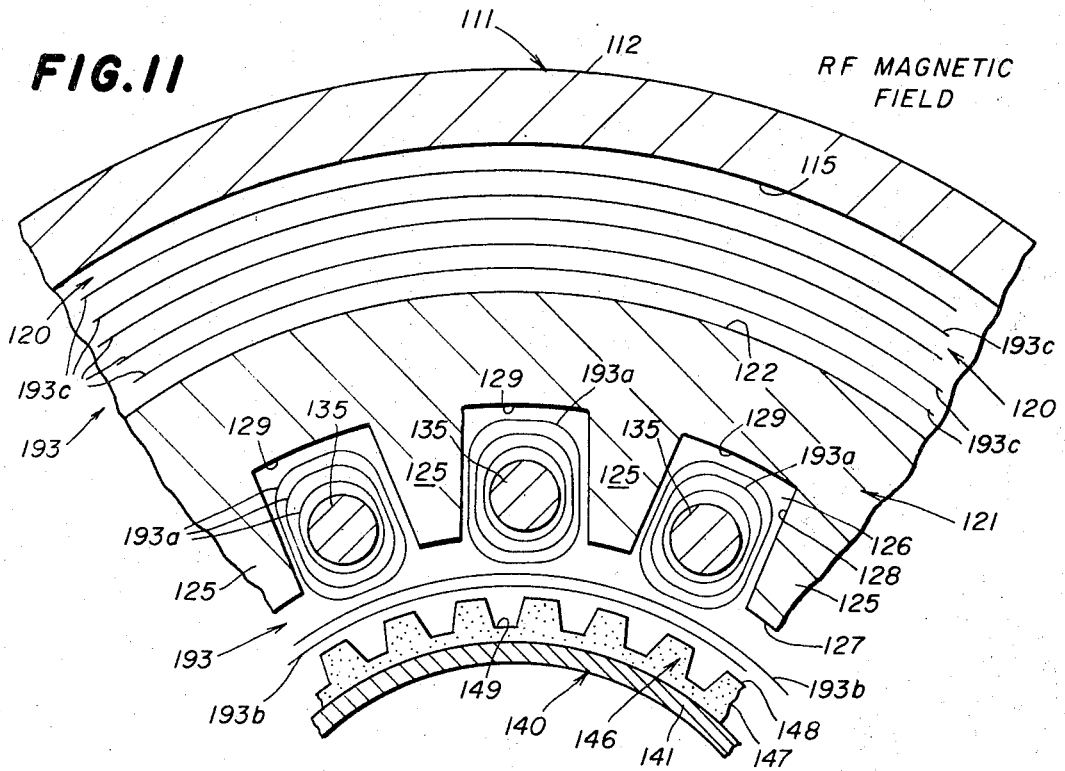

Associated with the RF electrical field 192 of the standing RF wave is an RF magnetic field 193 which is believed to have the form illustrated in FIG. 11; the RF magnetic field 193 is also disposed normal to the axis of the device 110 and is concentrated about and surrounds the rods 135 and the cathode 140 and the anode member 121. The major portion of the RF magnetic field 193 is disposed within the anode recesses 126 and is designated by the numeral 193a, but a portion of the magnetic field 193 extends about the cathode 140 and is designated by the numeral 193b. Another portion of the RF magnetic field 193 is disposed in the outer space 120 between the anode members 111 and 121 and is designated by the numeral 193c.

Figure 12:
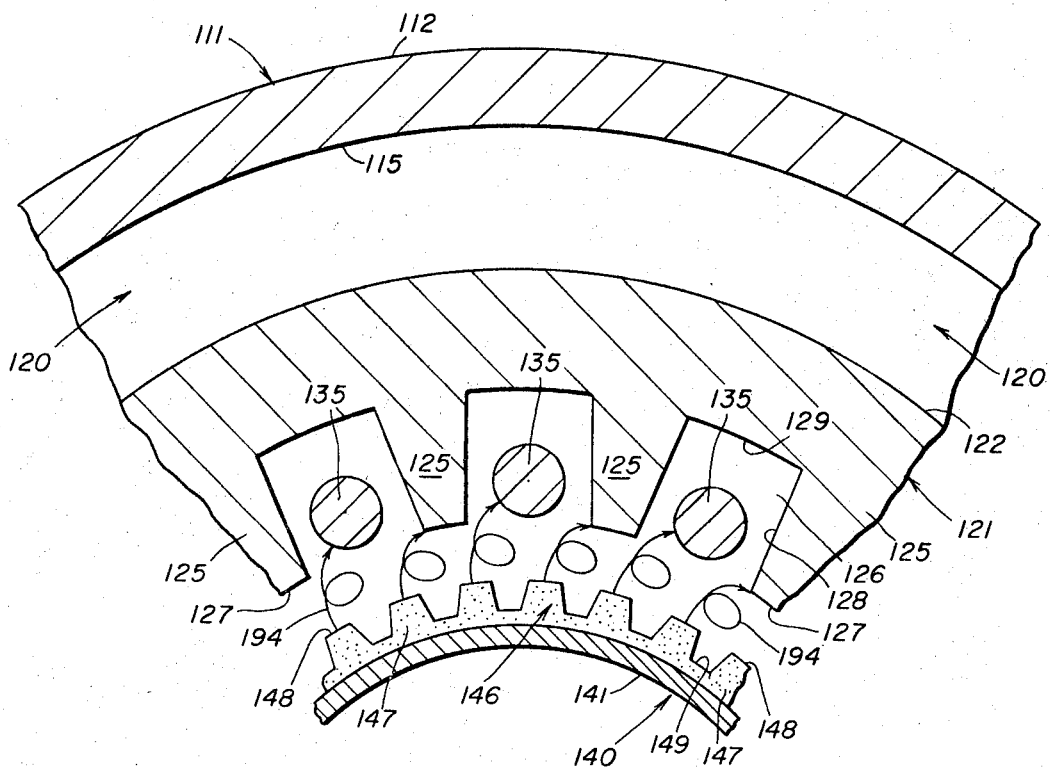

After the application of the operating potentials to the device 110, and after the cathode 140 has been heated to the operating temperature thereof by the heater 151, electrons are emitted from the emissive coating 146, the electrons being emitted into the interaction space 150 where they are subjected to the action of the unidirectional fields and the RF fields described hereinabove. There is illustrated in FIG. 12 of the drawings a diagrammatic representation of what are believed to be typical paths of electrons emitted from the cathode projections 147, the electron paths being designated by the numeral 194. As illustrated, the electrons follow a spiral path, the initial direction of flow being in a clockwise direction, this being due to the influence of the unidirectional magnetic field 191 described above. Eventually, the spiral paths 194 of the electrons carry them into contact with the inner anode member 121 or the rods 135, whereby to complete an electrical circuit through the device 110. During the time that the electrons are in the spiral paths 194, they impart a portion of the energy content thereof to the RF standing wave within the device 110 to add power thereto and to reinforce the RF standing wave.

Figure 13:
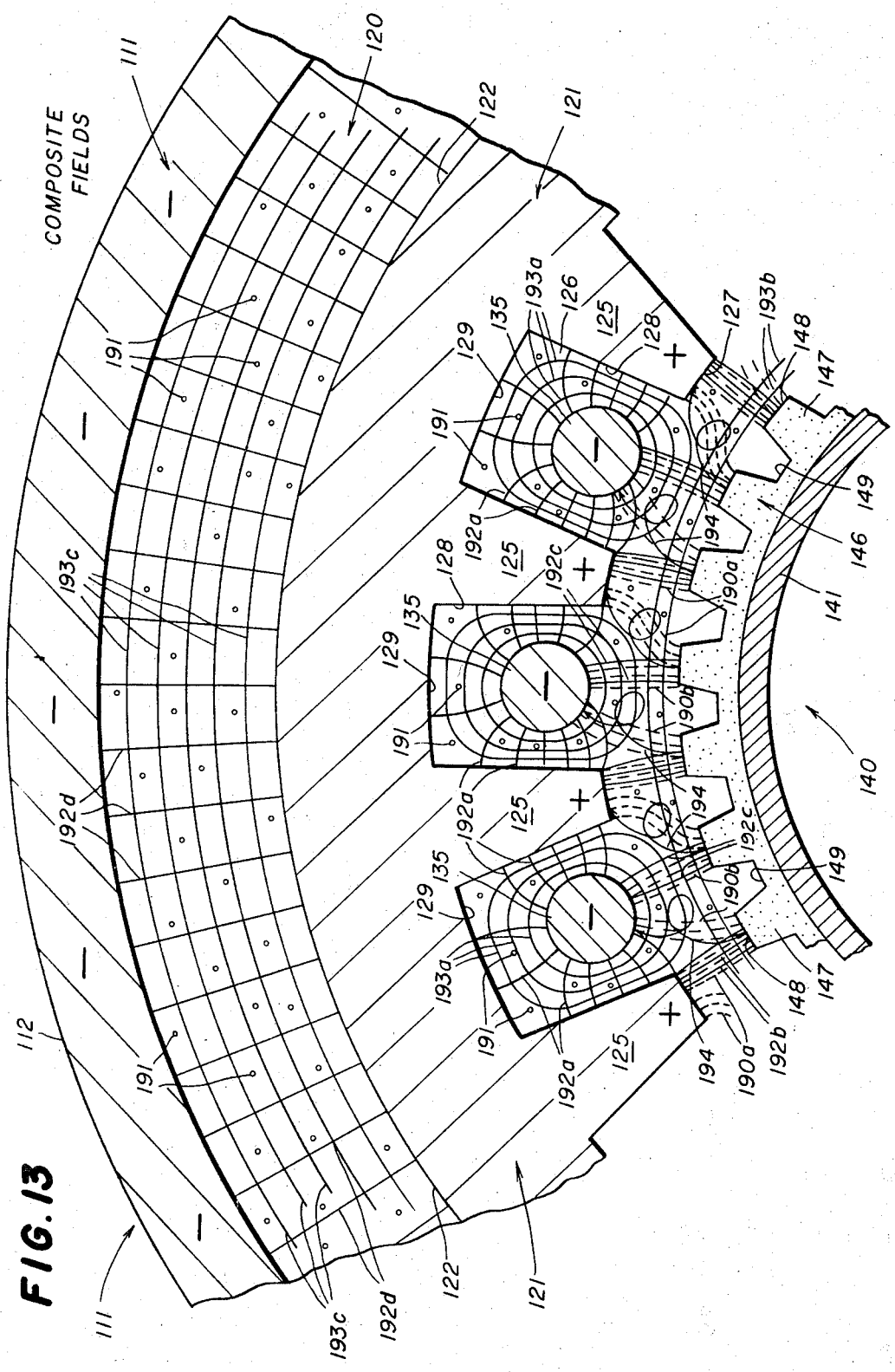

There is illustrated in FIG. 13 a composite representation of all of the fields that are believed to be present in the device 110 and in the outer space 120 and the interaction space 150 thereof when the device 110 is operating as a part of the oscillator 100. From FIG. 13 it is apparent that the electrons in the paths 194 clearly interact with the unidirectional fields and the RF fields within the interaction space 150, whereby to give up a portion of the energy of the electrons to the RF fields within the interaction space 150. More specifically, when an axial wave is excited on the inner portion of the transmission line, i.e., the portion of the transmission line defined by the inner surface of the inner anode member 121 and the rods 135, the axial wave is transmitted to the outer portion of the transmission line, i.e., to the portion of the transmission line defined by the inner surface 115 of the outer anode member 111 and the outer surface 122 of the inner anode member 121, and the axial wave is reflected at the inner surface of the flange 123. In this manner an RF electrical field is established between the anode member and the rods 135. This RF electrical field extends into the interaction space 150 and bunches electrons that rotate around the cathode 140 in the presence of the DC electrical field 190 and the DC magnetic field 191 established by the application of a negative potential to the cathode 140 and a positive potential to the anode structure and the rods 135. These electrons tend to rotate in synchronization with a slow wave component of the axial fast wave and to extract energy from the DC fields while giving up energy to the RF fields. In this manner the RF standing wave within the device 110 is maintained and the energy content thereof increased and replenished during the operation of the oscillator 100.

As is best seen from FIGS. 3 and 13, the cathode 140 is coupled to the RF standing wave within the interaction space 150 and therefore serves as a probe for removal of a portion of the RF energy from the tuned cavity for supplying thereof to the coupler and filter structure 170 and thence to the output transmission line 65. To this end the portion of the inner anode member 121 nearest the cathode 140 are given dimensions such that there is a capacitance between the anode structure and the cathode 140 that is greater than the capacitance between the rods 135 and the cathode 140. Thus the cathode 140 is unbalanced with respect to the anode structure and a net RF electrical potential exists permitting the coupling of the RF energy within the device 110 to the exterior thereof by means of a coaxial transmission line connected to the cathode structure 140 and the upper pole piece 130. In the structure illustrated, the terminal 102 is directly connected to the cathode structure 140 and the outer conductor 107 is directly connected to the upper pole piece 130, whereby an output RF potential appears therebetween. The coupler and filter structure 170 serves to connect the RF energy between the terminal 102 and the terminal 107 to the output transmission line 65, and also to apply to the cathode 140 via the probe 178 and the terminal 102 the B⁻ operating potential and the low voltage AC filament supply from the conductor 61 connected to the power supply 51, all without applying DC operating potentials to the conductors 66 and 67 of the transmission line 65 and without the introduction of RF energy into the power supply 51 via the conductor 61.

Referring to FIG. 2, the operation of the coupler and filter structure 170 will be further described. The output terminals including the terminal 102 and the conductor 107 connected respectively to the cathode 140 and the upper pole piece 130 of the device 110 also serve as RF input terminals to the coupler and filter structure 170, thereby to connect the oscillator 100 that serves as a source of RF potential to the RF input terminals of the coupler and filter structure 170. The RF input terminals 107 and 102 are capacitively coupled respectively to a pair of output terminals for the coupler and filter structure 170 in the form of the outer conductor 171 and the inner conductor 181, respectively, whereby to insure that the DC B⁺ and B⁻ potentials on the conductor 107 and the terminal 102, respectively, are not coupled to the output RF terminals 171 and 18, respectively. More specifically, the capacitive coupler 172 in the form of the insulating sleeve 173 provides a good RF coupling between the conductor 107 and the conductor 171, while preventing any DC connection therebetween. Likewise, the terminal 102 connected to the probe 178 is capacitively coupled by the coupler 182 to the output conductor 181, the insulating washer 183 serving to space the probe 178 and the telescopically arranged conductor 180 therearound.

As has been explained above, the conductors 107 and 171 are preferably telescoped and overlap a distance equivalent to ¼ wavelength of the operating frequency of the oscillator 100, and likewise the probe 178 and the associated conductors 180–181 are telescoped and overlap a distance equal to ¼ wavelength of the operating frequency of the oscillator 100. By so arranging the parts, the capacitive couplers 172 and 182 serve not only to couple the RF energy to the conductors 171 and 181, but also serve as filters for the second and higher harmonics of the operating frequency of the oscillator 100, thereby to attenuate and materially to reduce the amount of second and higher harmonics coupled to the RF output terminals provided by the coaxial conductors 171 and 181.

The DC B⁻ potential on the conductor 61 is directly connected to the cathode 140 via the conductor 184, the probe 178, the bullet 177, the terminal 102, the connector 158 and the conductors 159 and 159a and the conductor 143 (see FIG. 3 also). The same connection also applies the low voltage AC heater supply to the upper end of the heater 151. In order to prevent the propagation of the RF energy from the oscillator 100 into the conductor 61 via the probe 178 and the conductor 184, the choke 186 has been provided, the choke 186 having a length equal to ¼ wavelength of the operating frequency of the oscillator 100. The choke 186 is shorted at the outer end thereof by the conductive nut 187 and in cooperation with the outer conductor 174 and the capacitive insulator 185 serves to prevent propagation of the RF energy from the oscillator 100 along the conductor 184 and into the terminal 189 and the attached conductor 61. Due to the arrangement and dimensions of the parts, a parallel resonant circuit having a high impedance at the operating frequency of the oscillator 100 is provided, thereby to block the propagation of the RF energy along the conductor 184. In addition, the filter capacitor 188 of high capacitance is connected between the outer conductor 74 (which has applied thereto the B⁺ potential) and the terminal 189 (which has applied thereto the B⁻ potential) and serves as a short for RF frequencies at and above the operating frequency of the oscillator 100, whereby to by-pass the RF energy and prevent introduction thereof into the power supply 51 via the conductor 61.

Recapitulating, the RF input terminals 107 and 177 for the coupler and filter structure 170 are capacitively coupled to the RF output terminals 171 and 181, respectively, thereby efficiently to transmit the RF energy generated in the oscillator 100 to the RF output terminals 171 and 181. A second harmonic and higher harmonic filter is provided between the RF input terminals 107–177 and the RF output terminals 171–181 because of the overlapping telescoping arrangement of the conductors 107–171 and the conductors 178–180, these conductors respectively overlapping a distance equal to ¼ wavelength of the operating frequency of the oscillator 100. The fundamental operating frequency of the oscillator 100 cannot propagate over the transmission line comprising the conductors 174 and 184 because of the presence of the high impedance choke 186 disposed therein, the choke 186 acting as a parallel resonant circuit at the fundamental operating frequency of the oscillator 100 and thus presents a high impedance to the propagation of energy along the transmission line 174–184. In addition, the feed through filter 188 of high capacitance that is connected between the conductors 174 and 184 (and thus between the B+ and B− input terminals to the coupler and filter structure 170) provides a low impedance path for RF energy, and particularly the second and higher harmonics of the operating frequency of the oscillator 100, so that in cooperation with the choke 186, no RF energy is fed along the conductor 184 to the DC terminal 189 and along the conductor 61 to the power supply 51, and the lower voltage AC heater supply is nonetheless directly connected from the conductor 61 via the terminal 189, the conductor 184, the probe 178, the bullet 177, the terminal 102, the connector 158, the conductors 159 and 159a and the conductor 143 to the cathode 140 and the upper end of the heater 151. In this connection it is noted that no end shield is used on the heater end of the cathode 140. This is possible because of the low voltage operation of the device 110, whereby a higher value of magnetic field in this region seems to be adequate to prevent leakage currents; such leakage currents are further minimized due to the presence of relatively low potential RF fields in this region of the interaction space 150.

Likewise, the capacitive coupler 92 of high capacitance serves to by-pass RF energy between the lower end of the heater 151 and the conductor 108 (also connected to the B+ supply), whereby to prevent propagation of RF energy from the terminal 103 via the conductor 62 to the power supply 51.

As has been explained above, the RF wave within the oscillator 100 extends axially with respect to the device 110, there being no radial RF waves within the device 110, i.e., no RF waves extending normal to the axis of the device 110. Furthermore, the radial distance between the outer surface of the cathode 140 and the outer wall 129 of the anode recesses 126 is less than that required to accommodate a radial standing wave at the operating frequency of the oscillator 100. More specifically, the radial distance between the outer surface of the cathode 140 and the outer walls 129 of the anode recesses 126 is less than that required to accommodate a radial standing wave at an operating frequency having a wavelength corresponding to four times the distance between the inner surfaces of the flange 123 down and around the lower end of the inner anode member 121 and up to the upper ends of the rods 135. Likewise the distance between the facing coaxial surfaces of the anode members 111 and 121 defining the outer transmission line is less than that required to accommodate a radial standing wave at the operating frequency of the device 110 as defined above.

There are shown in FIGS. 14 and 15 performance charts for the crossed-field discharge device 110 described above. Referring first to FIG. 14, there is shown a standard Rieke diagram superimposed upon a Smith chart, the data being obtained utilizing a series magnetic field, i.e., the magnet coils 116 were connected in series with the inner anode member 121 with an applied B+ potential of 580 volts. As illustrated, a family of power curves 80 was attained, the members of the family of curves 80 corresponding to 0.4, 0.6, 0.8 and 1.0 times the maximum power having been illustrated in FIG. 14. A family of curves 81 showing the frequency of operation and the frequency pulling has also been plotted in FIG. 14, as has also the unstable region indicated by the numeral 82. The performance chart for the device 110 has been plotted in FIG. 14, the applied anode voltage being plotted along the vertical axis and the anode current being plotted along the horizontal axis. The curve 84 is a plot with a series field connected to the device 110, i.e., the magnet coils 116 were connected in series with the anode structure. There further is plotted a family of curves 85 showing the anode current for an applied anode potential when a separate magnetic field is applied to the device 110, the family of curves including performance curves when the separate magnetic field current has a value of 0.50, 0.75, 1.00, 1.25, 1.50 and 1.75 amperes. There also is provided a family of curves 86 in solid lines plotting lines of constant power output, eight of the curves in the family of curves 86 being shown plotting values from 5 watts to 350 watts of output power from the device 110. Finally, a family of curves 87 in dashed lines plotting the lines of constant efficiency expressed in percent have been shown in FIG. 14, four of the curves in the family of curves 87 being plotted for values of efficiency from 25% to 40% efficiency.

In a constructional example of the crossed-field discharge device 110, the various parts thereof have the following dimensions. The outer anode member 111 has an external diameter of 1⅝ inches, and an overall length of 1¼ inches. The inner anode member 121 at the wall 122 was an external diameter of 1⅛ inches, a length of ½ inch, a distance from the longitudinal axis to the surfaces 127 of ⅜ inch, a distance from the longitudinal axis to the surfaces 129 of ½ inch, a radial dimension of the recesses 126 of ⅛ inch, a circumferential dimension of the recesses 126 of ⅛ inch, and a circumferential dimension of the surfaces 127 of 3⁄32 inch. The rods 135 have a diameter of 1⁄16 inch and a length from the upper surface of plate 136 to the outer ends thereof of 13⁄16 inch and the inner surface of the rods 135 are spaced outwardly with respect to the adjacent surfaces 117 a distance of 0.008 inch. The cathode 140 has an overall diameter of 21⁄32 inch and a length of the emissive coating 146 of 19⁄32 inch; the projections 147 have a radial extent of 1⁄32 inch, the surfaces 148 have a circumferential extent of 1⁄32 inch, and the spaces 149 have a circumferential extent of 1⁄32 inch. The spacing between the anode surfaces 127 and the cathode surfaces 148 is 1⁄16 inch; the angular displacement between the center line of a cathode projection 147 and the center line of the adjacent anode segment 125 or rod 135 is 5°.

From the above description and particularly the dimensions of the illustrative example of the device 110, it will be seen that the physical dimensions thereof are very small compared to the wavelength of the microwave energy to be generated thereby and the power output therefrom. The thermal characteristics of the device 110 are excellent, the effects of thermal expansion of the parts being minimized resulting in an improved thermal stability. It will be understood that external cooling may be provided by means of a clamp-on radiator or cooling coil in lieu of the stacked array of cooling fins 119 illustrated. The anode members 111 and 121 are both constructed from a good heat conducting material and offer a very low thermal resistance thus permitting high power operations. The cantilever mounting of the rods 135 also contributes to the thermal stability of the device 110 since the major dimension thereof is axially of the tube, whereupon expansion of the rods 135 does not materially alter the spacing thereof with respect to the inner anode member 121 and the cathode structure 140.

The described construction of the device 110 further provides very large mode separation during operation thereof as an oscillator, since a single cavity of the type provided gives principal modes such as ¼, ¾, 5⁄4, etc.

wavelengths having substantial mode separation. Rotating waves present in conventional magnetrons are completely absent in the device 110, such rotating waves in conventional magnetrons giving large numbers of modes which are not widely separated even with very heavy strapping, thereby to provide problems of mode separation; all such problems of mode separation are completely avoided in the device 110.

It also has been found that the cathode coupling described above is very tight so that the resonant cavity within the device 110 may be heavily loaded for low Q, broad band operation which permits external tuning of at least ten percent. In addition the cathode coupling couples the energy from the device 110 uniformly around the interaction space 150 so that pattern distortion due to loading is avoided with a resultant increase in the efficiency of operation and stability of operation.

Referring to FIG. 16 of the drawings, there is diagrammatically illustrated the manner in which the output from the oscillator circuit 50 can be connected to the input of an amplifying circiut 200 which embodies therein certain additional features of the present invention. Inasmuch as the construction and operation of the power supply 51 and the oscillator 100 in the circuit of FIG. 16 are identical to those described above, like reference numerals have been applied to like parts throughout and the description thereof will not here be repeated. It will be understood that the output of the oscillator 100 is applied to a coaxial transmission line 210 which has the outer conductor 211 thereof connected to the capacitive coupler 172, and the outer conductor 211 is in turn connected by capacitive couplers 225 to a cavity connected to one end of a crossed-field discharge device 110 of the type set forth above. The transmission line 210 also comprises an inner conductor 212 which terminates in a radiating probe 213 that radiates into a cavity formed by a coaxial transmission line 220 connected to the input to the lower end of the device 110 (see FIG. 17 also). The amplifying circuit 200 also includes a pair of input terminals 201 and 202 that are connected respectively to the DC output terminals 54 and 55 of the power supply 51 by means of the conductors 60 and 61, respectively; the input terminal 202 is also connected by the conductor 61 to the low voltage AC output terminal 56 of the power supply 51. A third input terminal 203 is provided for the amplifying circuit 200, the input terminal 203 being connected by the conductor 62 to the low voltage AC output terminal 57 of the power supply 51.

The output of the amplifying circuit 200 is applied to a cavity including an outer conductor 247 that is capacitively coupled by the coupler 245 to an output transmission line 240 which connects with the transmission line 65. More specifically, the outer conductor of the transmission line 240 is directly connected to the outer conductor 66 of the transmission line 65 and a coupling probe 252 is provided within the transmission line 240 and is connected to the inner conductor 67 of the output transmission line 65. The capacitive coupling provided by the coupler 245 is desirable and necessary since the output terminal 247 is at a relatively high DC potential, whereby it is necessary electrically to isolate the output terminal 247 from the outer conductor 66 so that the outer conductor 66 can be grounded. As has been pointed out above, it is inherent in the construction and operation of the power supply 51, which is of the voltage doubler and rectifier type, that neither the conductor 60 nor the conductor 61 can be grounded, whereby it is also not possible to ground the output terminal 247 of the amplifying circuit 200. Accordingly, it is also necessary and desirable that the amplifying circuit 200 be electrically shielded by a grounded outer housing (not shown) disposed therearound in order to prevent a user of the amplifying circuit 200 from being placed in contact with relatively high DC voltages if the user should accidentally come in contact with the amplifying circuit 200.

The microwave energy supplied from the amplifying circuit 200 to the transmission line 65 can be used for any desired purpose, two typical uses of the microwave energy being illustrated in FIG. 16, the first use being illustrated in the upper righthand portion of FIG. 16, and the second use being illustrated in the lower righthand portion of FIG. 16. Referring to the first use illustrated in the upper righthand portion of FIG. 16, the transmission line 65 is shown coupled to an antenna of the type commonly used in search radar, the outer conductor 66 being connected to outer radiating or antenna elements 68, and the inner conductor 67 being connected to an inner radiating or antenna element 69, the antenna elements 68 and 69 serving to match the impedance of the transmission line 65 to the impedance of the atmosphere. Referring to the second use of the microwave energy illustrated in the lower righthand portion of FIG. 16, the transmission line 65 is shown coupled to an electronic heating apparatus, such as the electronic range 70 illustrated that is especially designed for home use. The electronic range 70 in FIG. 16, is identical to the electronic range 70 described above with respect to FIG. 1 of the drawings, and accordingly, like reference numerals have been applied to like parts throughout. The microwave energy within the transmission line 65 is radiated into the internal cavity of the electronic range 70 to provide the power for heating materials disposed therein. It further will be understood that in a preferred embodiment of the range 70, the power supply 51, the oscillator 100, and the amplifying circuit 200 together with the transmission line 65 are all preferably disposed within a common housing that also includes the casing 71, the common housing preferably being formed of metal and grounded for safety purposes.

Further details of the construction of the amplifying circuit 200 and the connections thereof to the crossed-field discharge device 110 incorporated therein will now be described with reference to FIG. 17 of the drawings. The construction of the crossed-field discharge device 110 incorporated in the amplifying circuit 200 of FIG. 17 is identical to the construction of the crossed-field discharge device 110 described above with reference to the oscillator 100 and illustrated in detail in FIGS. 3 to 7 of the drawings, whereby like reference numerals have been applied to like parts throughout including the magnet coils 116, the magnet yokes 137 and the associated mechanical and electrical connections. As illustrated, the input coaxial transmission line 210 includes an annular outer conductor 211 within which is disposed an inner conductor 212, the lefthand end of the outer conductor 211 communicating with an outer coaxial transmission line 220 that is connected to the lower end of the device 110. More specifically, the coaxial transmission line 220 includes an outer annular conductor 221 within which is disposed an annular inner conductor 222, the lower and outer ends thereof being interconnected and the space therebetween closed by an end wall 223. An opening is formed adjacent to the lower end of the outer conductor 221 and the outer conductor 211 is mechanically and electrically connected thereto in surrounding relationship with the opening therein. Connected between the input transmission line conductors 211 and 212 is a radiating probe 213 that serves to radiate the microwave energy within the input transmission line 210 into the coaxial transmission line 220. The outer conductor 221 extends upwardly toward the lower pole piece 130 and is capacitively coupled thereto by a coupler 225; more particularly, the outer annular conductor 227 is mechanically and electrically connected to the lower pole piece 130 and extends downwardly to the lower end of the magnet yoke 137 and surrounds the adjacent portion of the outer conductor 221, an insulating dielectric sleeve 226 being disposed between and substantially filling the annular space between the concentric conductors 221 and 227, the sleeve 226 being formed of a synthetic organic plastic resin, the preferred resin being a tetrafluoroethylene resin sold under the trademark "Teflon." The inner conductor 222 extends upwardly toward the lower end of the cathode 140 and is capacitively coupled thereto by a coupler 230; more particularly, an outer terminal 203 is threadedly connected at the upper end thereof to the connector 158 that is in turn connected to the cathode 140 via the heater 151 and is capacitively coupled to the cathode 140 at the lower end thereof, the terminal 203 extending downwardly beyond the end wall 223 and being disposed within and surrounded by the inner conductor 222, an insulating and dielectric sleeve 231 being disposed between and substantially filling the annular space between the terminal 203 and the conductor 221, the sleeve 231 being formed of a synthetic organic plastic resin, the preferred resin being a tetrafluoroethylene resin sold under the trademark "Teflon."

The output from the amplifying circuit 200 is taken from the upper end of the crossed-field discharge device 110, the output being taken from a coaxial transmission line 240 connected to the upper end of the device 110. More specifically, the coaxial transmission line 240 includes an outer annular conductor 241 within which is disposed an annular inner conductor 242, the upper and outer ends thereof being interconnected and the space therebetween closed by an end wall 243. An opening is formed adjacent to the upper end of the outer conductor 241 and the outer conductor 66 of the output transmission line 65 is mechanically and electrically connected thereto in surrounding relationship with the opening therein. Connected between the output transmission line conductors 66 and 67 is a probe 252 that serves to pick up the microwave energy within the output transmission line 240 and to apply the microwave energy to the output transmission line 65. The outer conductor 241 extends downwardly toward the upper pole piece 130 and is capacitively coupled thereto by a coupler 245; more particularly, an outer annular conductor 247 is mechanically and electrically connected to the upper pole piece 130 and extends upwardly to the upper end of the magnet yoke 117 and surrounds the adjacent portion of the outer conductor 241, an insulating dielectric sleeve 246 being disposed between and substantially filling the annular space between the concentric conductors 241 and 247, the sleeve 246 being formed of a synthetic organic plastic resin, the preferred resin being a tetrafluoroethylene resin sold under the trademark "Teflon." The inner conductor 242 extends downwardly toward the upper end of the cathode 140 and is capacitively coupled thereto by a coupler 250; more particularly, an output terminal 202 is provided having the lower end thereof threadedly attached to the connector 158 that is in direct electrical connection with the upper end of the cathode 140 and extends upwardly therefrom and outwardly beyond the end wall 243, the inner annular conductor 242 surrounding the adjacent portion of the terminal 202, and insulating dielectric sleeve 251 being disposed between and substantially filling the annular space between the terminal 202 and the conductor 242, the sleeve 251 being formed of a synthetic organic plastic resin, the preferred resin being a tetrafluoroethylene resin sold under the trademark "Teflon."

The conductor 60 that is connected to the B+ output terminal 54 of the power supply 51 is connected as at 201 to one terminal of the upper magnet coil 116, whereby to apply the B+ potential to the outer anode member 111 of the device 110 through the upper magnet coil 116, the conductor 138, the lower magnet coil 116, the conductor 139 and the cooling fins 119 that is electrically connected to the outer anode member 111. The conductor 61 that is connected both to the B− output terminal 55 of the power supply 51 and one of the terminals 56 carrying the low voltage AC output for the heater 151 is attached to the terminal 202 that is in turn directly connected to the cathode 140 through the connector 158, the conductors 159 and 159a and the conductor 143. Finally, the other terminal 57 of the power supply 51 carrying the low voltage AC output for the heater 151 is connected by the conductor 62 to the terminal 203 that is in turn connected to the other end of the heater 151.

The microwave energy to be amplified in the amplifying circuit 200 is applied thereto through the input transmission line 210, and more particularly, the probe 213 radiates into the coaxial transmission line 220 that is capacitively coupled both to the outer anode member 111 and the cathode 140, thereby to apply the input energy between the outer anode member 111 and the cathode 140. In order to provide a suitable match between the impedance of the transmission line 210 and the impedance of the amplifying circuit 200, the transmission line 220 preferably has a length equivalent to ¾ of the wavelength of the energy to be amplified, i.e., the distance between the inner surface of the outer wall 223 and a plane normal to the axis of the device 110 and disposed midway between the ends of the anode structure is equivalent to ¾ of the wavelength of the microwave energy to be amplified. It would also be permissible to connect the transmission line 210 to the transmission line 220 at a point spaced ¼ of the wavelength of the microwave energy to the amplified from the midplane of the device 110, but for most frequencies to be amplified it is not possible to make the necessary electrical connections at this point as illustrated in FIG. 17.

In order to provide a suitable match between the impedance of the amplifying circuit 200 and the impedance of the output transmission line 65, the transmission line 240 preferably has a length equivalent to ¾ of the wavelength of the microwave energy to be amplified, i.e., the distance between the inner surface of the end wall 243 and a plane normal to the axis of the device 110 and disposed midway between the ends of the anode structure is equivalent to ¾ of the wavelength of the microwave energy to be amplified. It would also be permissible to connect the transmission line 65 at a point spaced ¼ of the wavelength of the microwave energy being amplified from the midplane of the device 110, but for most frequencies it is not possible to make the necessary electrical connections at this point as illustrated in FIG. 17.

The microwave energy thus injected into the lower end of the amplifying circuit 200 passes into the crossed-field discharge device 110 and specifically along the coaxial transmission line provided by the cooperation between the cathode 140 forming one conductor and the interconnected inner anode member 121 and rods 135 forming the other conductor therein. As the microwave energy passes through the device 110, the RF fields associated therewith are reinforced and augmented by interaction with the electrons that pass from the cathode 140 to the inner anode member 121 and the rods 135. It is believed that the amplifying circuit 200 operates in accordance with the M-type fast wave interaction principle, whereby the input microwave energy in passing through the interaction space 150 interacts with the fields disposed therein, and the power content of the microwave energy is augmented and amplified so that a microwave energy output is obtained between the anode structure and the cathode 140 at the other end of the device 110 that has the same frequency as the microwave energy supplied through the input transmission line 210, but has a power content substantially greater than the power content of the microwave energy supplied via the transmission line 210, the power amplification being for example in the range from about 6 to 10. It has been found that the single interaction space 150 achieves this substantial amplification although the length thereof is on the order of less than 0.1 times the wavelength of the energy being amplified, whereas prior devices have required lengths of the interaction space that are many times the wavelength of the microwave energy being amplified, for example as many as twenty times the length of the wavelength of the microwave energy being amplified.

The output microwave energy appears between the conductors 241 and 242, the conductor 241 being capacitively coupled by the coupler 245 to the upper pole piece 130 and the conductor 242 being capacitively coupled by the coupler 250 to the cathode 140. The microwave energy in the transmission line 240 formed by the concentric conductive 241 and 242 is coupled by the probe 252 to the output transmission line 65, and specifically between the outer conductor 66 and the inner conductor 67 thereof.

It is pointed out that there is no cutoff frequency for the amplifying circuit 200 since the device 110 essentially comprises an open ended transmission line formed by the cooperation of the cathode 140 serving as one conductor and the inner anode member 121 and the interconnected rods 135 serving as the other conductor, whereby a wide spectrum of microwave energy can be amplified utilizing the amplifying circuit 200. The power gain, however, is a function of the bandwidth of the system which is determined by the Q of the cavity that is formed by the cooperation of the input transmission line 220 and the device 110; a large bandwidth requiring a lower Q results in a lower power gain, and conversely, a small bandwidth requiring a higher Q results in a higher power gain. The power gain is also a function of the length of the interaction space 150 in the device 110, a greater length of the interaction space 150 providing a greater power gain, and conversely, a smaller length of the interaction space 150 providing a smaller power gain.

To further illustrate the characteristics of the amplifying circuit 200, there are illustrated in FIG. 17 test connections to the input transmission line 210 and the output transmission line 65 by means of which other characteristics of the amplifying circuit 200 may be illustrated. The oscillator 100 as illustrated in FIG. 17 has the output thereof connected by a transmission line 270 to the input of an attenuator 272, a wave meter 271 also being connected to the transmission line 270 so that the frequency of the microwave energy supplied to the transmission line 270 can be monitored. The output from the attenuator 272 is applied by a transmission line 273 to the input of a tuner 274 which in turn has the output thereof connected to the input transmission line 210. The output transmission line 65 is connected to the input of an output tuner 275 that in turn is connected by a transmission line 276 to a load 278 by which the power provided from the amplifying circuit 200 can be measured; also connected to the transmission line 276 is a wave meter 277 by which the frequency of the microwave energy within the transmission line 276 can be monitored.

In a first test of the amplifying circuit 200, the operating potential were removed therefrom, i.e., the operating potentials applied via the conductors 60, 61 and 62 were removed; the input and output tuners 274 and 275, respectively, were adjusted to give maximum power transfer from the oscillator 100 into the load 278. When the operating potentials were then applied to the amplifying circuit 200 via the conductors 60, 61 and 62, the amount of microwave energy delivered to the load 278 was found to increase in proportion to the input power. The efficiency of amplification obtained was of the same order as that found when the device 110 was operated as a power oscillator as described above with reference to FIG. 2.

The frequency of the output energy delivered to the load 278 was then measured by means of the wave meter 277, and it was found that a single frequency of microwave energy was present in the transmission line 276, that frequency being the frequency of operation of the oscillator 100 as determined by the wave meter 271. The frequency of operation of the oscillator 100 was then varied to determine whether the frequency of the output was due to the tuning of the circuits in the amplifying circuit 200, and it was found that the output frequency of the amplified microwave energy as measured by the wave meter 277 varied directly in accordance with the variations in the frequency of operation of the oscillator 100 as determined by the wave meter 271, whereby it was concluded that there was no electronic tuning effect in the amplifying circuit 200. Further to verify that there was no operation of the amplifying circuit 200 as an oscillator, the operating potentials were removed from the oscillator 100 so that no output was obtained therefrom as measured by the wave meter 271. The output from the amplifying circuit 200 immediately dropped to zero indicating that there were no oscillations in the amplifying circuit 200 whereby to verify that the operation of circuit 200 was truly as an amplifier and not as an oscillator.

Finally, the microwave energy to the amplifying circuit 200 was varied by means of the attenuator 272 over the range from 1 watt to 100 watts. It was determined that there was stable operation of the amplifying circuit 200 over the entire range of power input, the output from the amplifier 200 as measured by the load 278 being directly proportional to the power supplied as an input to the amplifying circuit 200 via the input transmission line 210.

There further are illustrated in FIG. 17 additional connections to the amplifying circuit 200 to accommodate the application of modulating signals thereto. More specifically, there is provided a resistor 280 having one terminal thereof connected by a conductor 281 to the tubular conductor 227 that is connected to the upper pole piece 130 and thus to the anode of the device 110, the conductor 281 also being connected to a terminal 282; and the other terminal of the resistor 280 is connected by the conductor 62 to the terminal 203 that is directly connected to the cathode 140, the conductor 62 also being connected to a terminal 283. Accordingly, it will be seen that the input terminal 282 is directly connected to the anode and the input terminal 283 is connected to the cathode 140 of the device 110. A modulating signal can be applied between the input terminals 282 and 283, whereby to modulate the amplitude of the microwave energy supplied by the output of the amplifying circuit 200 to the output transmission line 65.

From the above it will be seen that there have been provided improved crossed-field discharge devices, improved microwave oscillator circuits incorporating the crossed-field discharge devices therein, and improved amplifier circuits incorporating the crossed-field discharge devices therein which fulfill all of the objects and advantages set forth above. More particularly, there have been provided improved crossed-field discharge devices for use at microwave frequencies which are of simple and economical construction and arrangement, the devices being particularly adapted for operation with low applied potentials between the anode and the cathode thereof. The improved crossed-field discharge devices provide a high output of microwave energy in proportion to the physical dimensions thereof, whereby to permit the miniaturization of microwave circuits employing the improved crossed-field discharge devices of the present invention.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A crossed-field discharge device comprising an anode structure including an annular outer anode member and an annular inner anode member disposed within said outer anode member and electrically connected thereto at one end of said anode structure, said anode members cooperating to define a first axially extending space therebetween and said inner anode member defining a second axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, means for establishing a unidirectional magnetic field extending axially through said first axially extending space and said interaction space, and end structures enclosing both the ends of said anode structure and said axially extending spaces, said anode structure and said rods and said interconnecting means defining a frequency determining folded resonant cavity for said device.

2. The crossed-field discharge device set forth in claim 1, wherein said means for establishing a unidirectional magnetic field includes a pair of pole pieces respectively arranged adjacent to the opposite ends of said anode structure.

3. The crossed-field discharge device set forth in claim 1, wherein said outer anode member and said inner anode member cooperate to provide therebetween a section of a first coaxial transmission line short circuited at said one end of said anode structure, and said inner anode member and said rods cooperate to provide therebetween a section of a second coaxial transmission line, said first and second transmission lines being connected at said other end of said anode structure and cooperating to provide a frequency determining folded resonant cavity for said device having a total length equivalent to one-fourth wavelength of the operating frequency thereof.

4. The crossed-field discharge device set forth in claim 1, and further comprising means electrically interconnecting said rods at said other end of said anode structure.

5. The crossed-field discharge device set forth in claim 1, wherein the radial distance between the outer surface of said cathode structure and the outermost portion of the adjacent one of said anode recesses is less than that required to accommodate a radial standing wave at the frequency of said resonant cavity, and the radial distance between the outer surface of said inner anode member and the inner surface of said outer anode member is less than that required to accommodate a radial standing wave at the frequency of said resonant cavity.

6. A crossed-field discharge device comprising an anode structure including an annular outer anode member and an annular inner anode member disposed within said outer anode member and electrically connected thereto at one end of said anode structure, said anode members cooperating to define a first axially extending space therebetween and said inner anode member defining a second axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plate mounted adjacent to the other end of said anode structure and having mounted thereon and extending therefrom in cantilever fashion a plurality of rods corresponding in number to said anode recesses and respectively disposed therein and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, means for establishing a unidirectional magnetic field extending axially through said first axially extending space and said interaction space, and end structures enclosing both the ends of said anode structure and said axially extending spaces, said anode structure and said rods and said interconnecting means defining a frequency determining folded resonant cavity for said device.

7. The crossed-field discharge device set forth in claim 6, wherein the longitudinal axis of each of said rods is disposed substantially parallel to the longitudinal axis of said cathode structure and said interaction space, the cross sections of each of said rods being small compared to the longitudinal extent thereof whereby the major dimension thereof is in a direction parallel to the axis of said cathode structure and the axis of said interaction space, thus to avoid changes in the spacing between said rods and said cathode structure due to thermal expansion of said rods.

8. The crossed-field discharge device set forth in claim 6, wherein the capacitance between said anode structure and said cathode structure is greater than the capacitance between said rods and said cathode structure, thus to produce an RF potential between said anode structure and said cathode structure.

9. The crossed-field discharge device set forth in claim 8, wherein said anode recesses are substantially square as viewed in a direction axially of said device, said rods are substantially circular in cross section, and said anode segments extend radially inwardly beyond the innermost surfaces of the associated rods, thereby to provide a capacitance between the anode structure and the cathode structure that is greater than the capacitance between said rods and said cathode structure.

10. A crossed-field discharge device comprising an anode structure including an annular outer anode member and an annular inner anode member disposed within said outer anode member and electrically connected thereto at one end of said anode structure, said anode members cooperating to define a first axially extending space therebetween and said inner anode member defining a second axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including a plurality of circumferentially spaced electron emissive sections corresponding in number to the sum of the number of said anode segments and the number of said rods and disposed adjacent to the inner portion of said interaction space, means for establishing a unidirectional magnetic field extending axially through said first axially extending space and said interaction space, and end structures enclosing both the ends of said anode structure and said axially extending spaces, said anode structure and said rods and said interconnecting means defining a frequency determining folded resonant cavity for said device.

11. The crossed-field discharge device set forth in claim 10, wherein said electron emissive sections are equal in number to the sum of the number of said anode segments and the number of said rods and are respectively arranged adjacent to one of said anode segments or one of said rods.

12. The crossed-field discharge device set forth in claim 10, wherein said electron emissive sections are circumferentially spaced apart a distance corresponding generally to the circumferential dimension thereof.

13. The cross-field discharge device set forth in claim 10, wherein said electron emissive sections have a circumferential extent of approximately 25% to 60% of the circumferential distance between the centers of adjacent electron emissive sections.

14. The crossed-field discharge device set forth in claim 10, wherein said electron emissive sections are in the form of protrusions extending radially outwardly from said cathode structure into said interaction space, and the radial dimension of each of said protrusions is greater than about 25% of the spacing between said inner anode member and said cathode structure.

15. The crossed-field discharge device set forth in claim 10, wherein the centerline of each electron emissive section is circumferentially displaced relative to the centerline of its corresponding anode segment or rod between 0% and approximately 45% of the circumferential spacing between the centerline of an anode segment and the centerline of an adjacent rod.

16. The crossed-field discharge device set forth in claim 10, wherein the centerline of each of said electron emissive sections is circumferentially displaced relative to the centerline of its corresponding anode segment or rod between approxmiately 35% and approximately 45% of the spacing between the centerline of an anode segment and the centerline of an adjacent rod and on the downstream side of the corresponding anode segement or rod relative to the normal initial electron flow from said electron emissive sections toward said anode segments and said rods in said device.

17. A crossed-field discharge device comprising an anode structure including an annular outer anode member and an annular inner anode member disposed within said outer anode member and electrically connected thereto at one end of said anode structure, said anode members cooperating to define a first axially extending space therebetween and said inner anode member defining a second axially extending space therethrough communicating with said first axially extending space at the other end of said anode structure, a plurality of axially extending anode segments on said inner anode member and projecting radially into said second axially extending space and providing a correspondingly plurality of axially extending anode recesses therebetween, a plurrality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, means for establishing a unidirectional magnetic field extending axially through said first axially extending space and said interaction space, means for establishing an axially extending RF wave in said axially extending spaces and having associated therewith RF electrical fields and RF magnetic fields normal to the axis of said device and extending into said interaction space, output connections respectively coupled to said anode structure and said cathode structure for removing RF energy from said axially extending spaces utilizing said cathode structure as a probe interacting with said RF fields, and end structures enclosing both the ends of said anode structure and said axially extending spaces.

18. The crossed-field discharge device set forth in claim 17, wherein a first one of said end structures joins corresponding first ones of the adjacent ends of said anode structure and said cathode structure and mechanically supports said cathode structure with respect to said anode structure while providing electrical insulation therebetween, and a second one of said end structures joins corresponding second ones of the adjacent ends of said anode structure and said cathode structure and mechanically supports said cathode structure, with respect to said anode structure while providing electrical insulation therebetween.

19. The crossed-field discharge device set forth in claim 17, wherein said end structures are the only electrically insulating seals for said device.

20. The crossed-field discharge device set forth in claim 17, wherein, said cathode structure also includes a cathode carrying said electron emissive element and a heater for said cathode disposed adjacent thereto, a first connector commonly electrically connected both to said cathode and to one terminal of said heater, a second connector electrically connected to the other terminal of said heater, a first one of said end structures joining the one end of said anode structure and said first connector for mechanically supporting said cathode and said heater with respect to said anode srtucture while providing electrical insulation therebetween, a second one of said end structures joining the other end of said anode structure and said second connector for mechanically supporting said cathode and said heater with respect to said anode structure while providing electrical insulation therebetween.

21. A microwave oscillator comprising a crossed-field discharge device including an anode structure having an annular outer anode member and an annular inner anode member disposed within said outer anode member and electrically connected thereto at one end of said anode structure, said anode members cooperating to define a first axially extending space therebetween and said inner anode member defining an axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, and end structures enclosing both the ends of said anode structure and said axially extending spaces, said anode structure and said axially extending spaces, said anode structures and said rods and said interconnecting means defining a frequency determining resonant cavity for said device; means for producing a unidirectional magnetic field extending axially through said axially extending spaces; and means for producing a unidirectional electrical field between said anode structure and said cathode structure.

22. The microwave oscillator set forth in claim 21, and further comprising output connections respectively coupled to said anode structure and said cathode structure, said unidirectional magnetic field and said unidirectional electrical field and said resonant cavity cooperating to establish an axially extending RF wave in said axially extending spaces and having associated therewith RF electrical fields and RF magnetic fields normal to the axis of said device and extending into said interaction space, said output connections removing RF energy from said axially extending space utilizing said cathode structure as a probe interacting with said RF fields.

23. The microwave oscillator set forth in claim 21, wherein said cathode structure includes a cathode carrying said electron emissive element and a heater for said cathode disposed adjacent thereto, and further comprising a first connector commonly electrically connected both to said cathode and to one terminal of said heater, a second connector electrically connected to the other terminal of said heater, a first one of said end structures joining the one end of said anode structure and said first connector for mechanically supporting said cathode and said heater with respect to said anode structure while providing electrical insulation therebetween, and a second one of said end structures joining the other end of said anode structure and said second connector for mechanically supporting said cathode and said heater with respect to said anode structure while providing electrical insulation therebetween; said unidirectional magnetic field and said unidirectional electrical field and said resonant circuit cooperating to establish an axially extending RF wave in said axially extending spaces and having associated therewith RF electrical fields nad RF magnetic fields normal to the axis of said device and extending into said interaction space; and output connections respectively coupled to said anode structure and said first connector for removing RF energy from said axially extending space utilizing said cathode as a probe interacting with said RF fields.

24. A microwave amplifier comprising a crossed-field discharge device including an anode structure having an annular outer anode member and an annular inner anode member disposed within said outer anode member and electrically connected thereto at one end of said anode structure, said anode members cooperating to define a first axially extending space therebetween and said inner anode member defining an axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, and end structures enclosing both the ends of said anode structure and said axially extending spaces; a microwave input coupled between said anode structure and said cathode structure at said other end of said anode structure; a microwave output coupled between said anode structure and said cathode structure at said one end of said anode structure; means for producing a unidirectional magnetic field extending axially through said axially extending spaces; and means for producing a unidirectional electrical field between said anode structure and said cathode structure; whereby a microwave signal fed to the input of said amplifier is amplified thereby and the amplified microwave signal appears at the output of said amplifier.

25. The microwave amplifier set forth in claim 24, wherein said microwave output includes a pair of output connections respectively coupled to said anode structure and said cathode structure, said unidirectional magnetic field and said unidirectional electrical field and said microwave input cooperating to establish an axially extending RF wave in said axially extending spaces and having associated therewith RF electrical fields and RF magnetic fields normal to the axis of said device and extending into said interaction space, said output connections removing energy from said axially extending space utilizing said cathode structure as a probe interacting with said RF fields.

26. The microwave amplifier set forth in claim 24, wherein, said cathode structure includes a cathode carrying said electron emissive element and a heater for said cathode disposed adjacent therebetween, and further comprising a first connector commonly electrically connected to both said cathode and to one terminal of said heater, a second connector electrically connected to the other terminal of said heater, a first one of said end structures joining the one end of said anode structure and said first connector for mechanically supporting said cathode and said heater with respect to said anode structure while providing electrical insulation therebetween, and a second one of said end structures joining the other end of said anode structure and said second connector for mechanically supporting said cathode and said heater with respect to the anode structure while providing electrical insulation therebetween, said microwave input being coupled between said anode structure and said second connector for supplying RF energy to said device; said unidirectional magnetic field and said unidirectional electrical field and said microwave input cooperating to establish an axially extending RF wave in said axially extending spaces and having associated therewith RF electrical fields and RF magnetic fields normal to the axis of said device and extending into said interaction space; said microwave output being coupled between said anode structure and said first connector for removing RF energy from said axially extending space utilizing said cathode as a probe interacting with said RF fields.

27. A microwave circuit comprising a crossed-field discharge device including an anode structure having an annular outer anode member and an annular inner anode member disposed within said outer anode member and electrically connected thereto at one end of said anode structure, said anode members cooperating to define a first axially extending space therebetween and said inner anode member defining an axially extending space therethrough communicating with said first axially extending space at the other end of said anode structure, a plurality of axially extending anode segments on said inner anode member and projecting radially into said second axially extending space and providing a corresponding plurality of axially extending anode recesses therebetween, a plurality of rods respectively disposed in said anode recesses and respectively spaced from the adjacent ones of said anode segments, means electrically interconnecting said anode structure and said rods at the other end of said anode structure, an axially extending cathode structure disposed in said second axially extending space and cooperating with said inner anode member to define an axially extending annular interaction space, said cathode structure including an electron emissive element disposed adjacent to the inner portion of said interaction space, and end structures enclosing both the ends of said anode structure and said axially extending spaces; means for producing a unidirectional magnetic field extending axially through said axially extending spaces; means for producing a unidirectional electrical field between said anode structure and said cathode structure; and means for applying a modulating signal between said anode structure and said cathode structure for modulating the output of said microwave circuit.

28. The microwave circuit set forth in claim 27, wherein said anode structure and said rods and said interconnecting means define a frequency determining resonant cavity for said device, whereby said microwave circuit is an oscillator having the output thereof modulated in accordance with the modulating signal applied to said modulating means.

29. The microwave circuit set forth in claim 27, and further comprising a microwave input coupled between said anode structure and said cathode structure at said other end of said anode structure; and a microwave output coupled between said anode structure and said cathode structure at said one end of said anode structure; whereby said microwave circuit is an amplifier in which the output thereof is modulated in accordance with the modulating signal applied to said modulating means.

30. The crossed-field discharge device set forth in claim 10, wherein each of said circumferentially spaced electron emissive sections has an axial extent no greater than the axial extent of said inner anode member.

References Cited
UNITED STATES PATENTS

| 2,808,568 | 10/1957 | Cuccia | 315—39.63 X |
| 2,819,449 | 1/1958 | Herold | 315—39.3 X |
| 3,022,443 | 2/1962 | Fowler | 315—39.3 |
| 3,255,422 | 6/1966 | Feinstein | 315—39.3 X |

HERMAN KARL SAALBACH, *Primary Examiner.*
SAXFIELD CHATMON, Jr., *Assistant Examiner.*

U.S. Cl. X.R.

315—39.53, 39.63, 39.71, 39.73; 331—86; 333—83